(12) United States Patent
Kinkead et al.

(10) Patent No.: US 12,337,950 B2
(45) Date of Patent: Jun. 24, 2025

(54) LANDING GEAR FEEDBACK CONTROL SYSTEM FOR AN AIRCRAFT

(71) Applicant: Lockheed Martin Corporation, Bethesda, MD (US)

(72) Inventors: Matt Kinkead, Milford, CT (US); Jay Monahan, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 396 days.

(21) Appl. No.: 17/488,528

(22) Filed: Sep. 29, 2021

(65) Prior Publication Data

US 2023/0098878 A1    Mar. 30, 2023

(51) Int. Cl.
| | |
|---|---|
| *B64C 13/04* | (2006.01) |
| *B64C 13/16* | (2006.01) |
| *B64C 25/06* | (2006.01) |
| *B64C 25/34* | (2006.01) |
| *B64C 27/10* | (2023.01) |
| B64C 25/32 | (2006.01) |

(52) U.S. Cl.
CPC .............. *B64C 13/16* (2013.01); *B64C 13/04* (2013.01); *B64C 25/06* (2013.01); *B64C 25/34* (2013.01); *B64C 27/10* (2013.01); *B64C 2025/325* (2013.01)

(58) Field of Classification Search
CPC ....... B64C 13/04; B64C 13/042; B64C 13/16; B64C 13/18; B64C 13/503; B64C 2025/325; B64C 2027/8236; B64C 25/06; B64C 25/32; B64C 25/34; B64C 27/10; B64C 27/57; B64C 27/82; G05D 1/0858

See application file for complete search history.

(56) References Cited

U.S. PATENT DOCUMENTS

| | | | |
|---|---|---|---|
| 5,446,666 | A | 8/1995 | Bauer |
| 7,357,357 | B2 | 4/2008 | Giazotto |
| 9,354,635 | B2 | 5/2016 | Shue |
| 9,915,954 | B2 | 3/2018 | Vallart et al. |
| 10,315,780 | B2 | 6/2019 | Waltner et al. |
| 10,766,613 | B2 | 9/2020 | Alfred et al. |

(Continued)

FOREIGN PATENT DOCUMENTS

EP    3208190 A1    8/2017

OTHER PUBLICATIONS

European Patent Office Extended European Search Report for application 22197043.7, dated Feb. 3, 2023, (8 pages).

(Continued)

*Primary Examiner* — Thomas Ingram
*Assistant Examiner* — Michael J Herrera
(74) *Attorney, Agent, or Firm* — Michael Best & Friedrich LLP

(57) ABSTRACT

A control system for an aircraft, the system including a pilot input device configured to receive a pilot input, a plurality of sensors, each of the plurality of sensors positioned on a corresponding landing gear of the aircraft and configured to sense a parameter on the corresponding landing gear, and a controller in communication with the plurality of sensors, the controller configured to calculate an output command based on the pilot input and the sensed parameters of the landing gear, the output command including instructions for controlling a rotor of the aircraft.

17 Claims, 16 Drawing Sheets

(56) References Cited

U.S. PATENT DOCUMENTS

| | | | |
|---|---|---|---|
| 10,809,744 B2 | 10/2020 | White | |
| 2011/0049290 A1* | 3/2011 | Seydoux | A63H 27/12 |
| | | | 348/114 |
| 2016/0327958 A1* | 11/2016 | Vallart | G05D 1/0676 |
| 2017/0008619 A1* | 1/2017 | Romana | G05D 1/0204 |
| 2017/0088281 A1 | 3/2017 | Vallart et al. | |
| 2018/0305038 A1* | 10/2018 | Waltner | B64C 13/503 |
| 2019/0016443 A1* | 1/2019 | Alfred | B64C 13/503 |
| 2019/0161181 A1* | 5/2019 | Alfred | B64C 13/503 |
| 2021/0171190 A1* | 6/2021 | Bellera | B64C 9/00 |
| 2021/0271267 A1* | 9/2021 | Thomas | B64U 10/13 |
| 2022/0197308 A1* | 6/2022 | Wittmaak, Jr. | G01S 13/882 |
| 2022/0326704 A1* | 10/2022 | Moy | B64D 31/06 |

OTHER PUBLICATIONS

European Patent Office Action for Application No. 22197043.7 dated Sep. 3, 2024 (5 pages).

* cited by examiner

LANDING GEAR FEEDBACK CONTROL SYSTEM FOR AN AIRCRAFT

FIELD OF INVENTION

Embodiments described herein relate to aircraft and, in particular, to methods for rotary wing aircraft.

BACKGROUND

A dual, rotary wing aircraft generally includes an airframe with an extending tail. A dual, counter rotating, coaxial main rotor assembly is located at the airframe and rotates about a main rotor axis. The main rotor assembly includes an upper rotor assembly driven in a first direction (e.g., counter-clockwise) about the main rotor axis and a lower rotor assembly driven in a second direction about the main rotor axis opposite to the first direction (i.e., counter rotating rotors). Each of the upper rotor assembly and the lower rotor assembly includes a plurality of rotor blades secured to a rotor hub. The aircraft may further include a translational thrust system located at the extending tail to provide translational thrust (forward or rearward).

Some rotary wing aircraft, such as dual rotary wing aircraft described above, are susceptible to external conditions, such as weather, and may be difficult to control during certain weather conditions. For example, high winds may affect the aircraft during various stages of flight. Winds may be particularly difficult to manage when the aircraft is in a landed flight state. Therefore, pilots must be actively controlling the main rotary assembly during the landed flight state in order to quickly respond to external wind condition and maintain the aircraft in a steady position.

SUMMARY

Embodiments described herein provide a control system for an aircraft including a pilot input device configured to receive a pilot input, a first sensor positioned on a first landing gear of the aircraft, the first sensor configured to sense a force on the first landing gear, and a controller in communication with the pilot input device and the first sensor. The controller is configured to receive the pilot input via the pilot input device, receive a sensed force on the first landing gear via the first sensor, calculate an output command based at least on the pilot input and the force on the first landing gear, and transmit the output command to control the aircraft.

Embodiments described herein provide a method of controlling an aircraft, where the method includes receiving, by an electronic processor, a pilot input including a setpoint, receiving a first signal from a first sensor positioned on a landing gear of the aircraft, determining a first correction factor based on the setpoint and the first signal, determining an output command based on the first correction factor, the output command including instructions for controlling the aircraft, and transmitting the output command to control the aircraft.

Embodiments described herein provide a control system for an aircraft including a pilot input device configured to receive a pilot input, a plurality of sensors, each of the plurality of sensors positioned on a corresponding landing gear of the aircraft and configured to sense a parameter on the corresponding landing gear, and a controller in communication with the plurality of sensors, the controller configured to calculate an output command based on the pilot input and the sensed parameters of the landing gear, the output command including instructions for controlling a rotor of the aircraft.

Embodiments described herein provide a control system for an aircraft, where the control system includes a first sensor positioned on the body of the aircraft, a second sensor positioned on a landing gear of the aircraft, and a controller in communication with the first sensor and the second sensor. The controller is configured to control the aircraft based on a control loop having a first control sub-loop associated with the first sensor and a second control sub-loop associated with the second sensor. When the aircraft is in a landed flight state, the controller is configured to operate the first control sub-loop in a first control mode and operate the second control sub-loop in a second control mode.

Embodiments described herein provide a method of controlling an aircraft. The method includes the steps of receiving a pilot input including a setpoint, receiving a first signal from a first sensor positioned on a body of the aircraft, and determining a first correction factor based on the setpoint and the first signal. The method further includes the steps of receiving a second signal from a second sensor positioned on a landing gear of the aircraft, determining a second correction factor based on the setpoint and the second signal, and determining an output command based on the first correction factor and the second correction factor, the output command including instructions for controlling the aircraft.

Embodiments described herein provide a control system for an aircraft, where the control system includes a plurality of first sensors, each of the plurality of first sensors positioned on a corresponding landing gear of the aircraft and configured to sense a force on the corresponding landing gear, and a controller in communication with the plurality of first sensors, the controller configured to control the aircraft based on a control loop having a first control sub-loop associated with a moment of the aircraft and a second control sub-loop associated with an attitude of the aircraft, wherein the plurality of first sensors is configured to send signals to the controller via the first control sub-loop.

Other aspects will become apparent by consideration of the detailed description and accompanying drawings.

DETAILED DESCRIPTION

Figure 1:
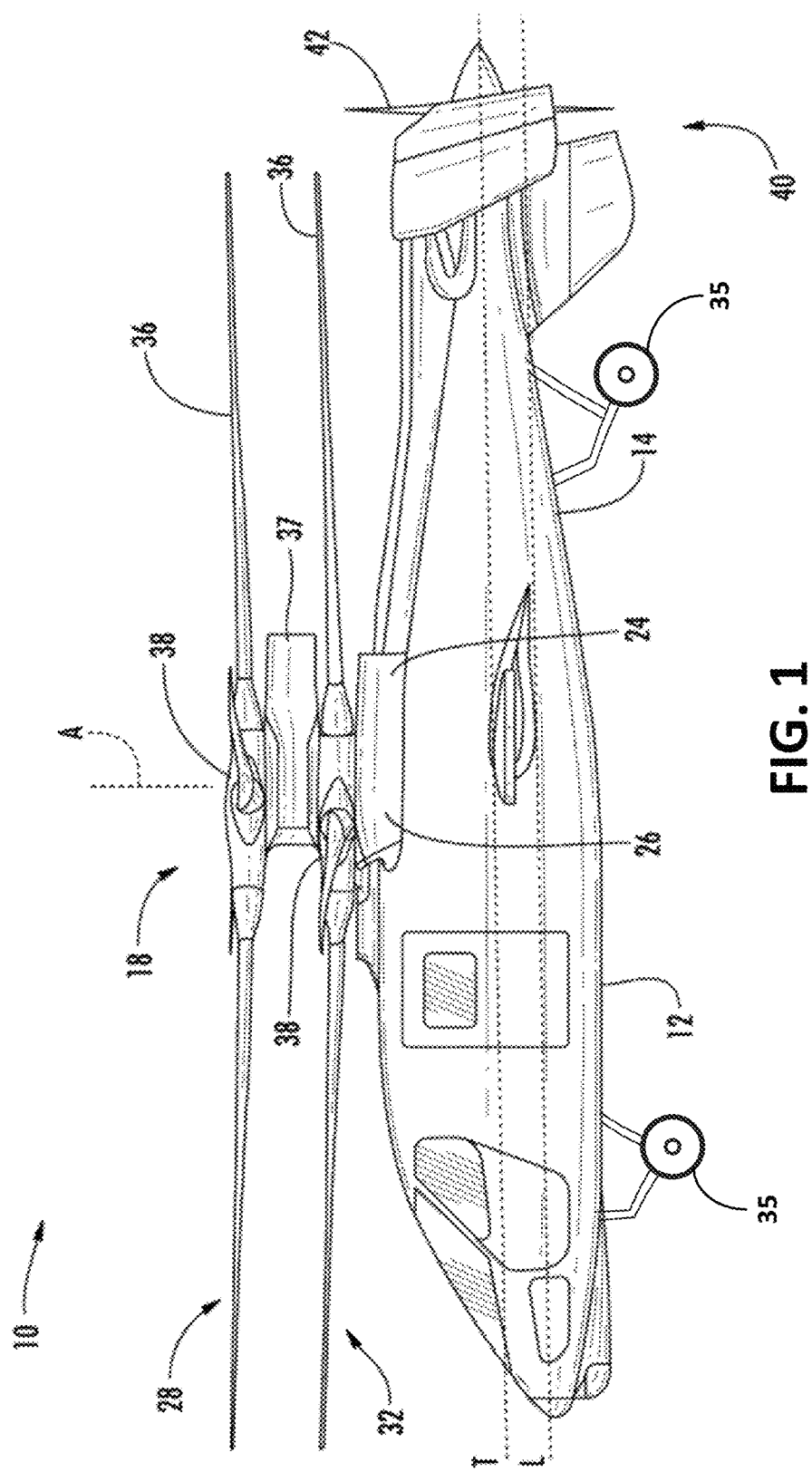
FIG. 1 depicts a rotary wing aircraft according to an exemplary embodiment.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

Some aircraft, such as rigid rotor aircraft or coaxial dual rotor aircraft, have a strong response to external forces like gusts of winds. Therefore, the pilot must be actively controlling the aircraft at all times, even in moderate conditions or relatively low winds. Additionally, these types of aircraft may be restricted from flying altogether during moderate to high wind conditions.

Accordingly, provided herein is a system and method of controlling the aircraft to reduce pilot workload during moderate external conditions, such as wind gusts. As described herein, the flight control computer (FCC) may control the aircraft based on sensed forces from the landing gear assemblies in addition to one or both attitude feedback and rate gyro feedback from an airframe sensor. Furthermore, the FCC may maintain the stability of the aircraft by creating an output command, which includes a quick reacting component in response to the disturbance (e.g., the gust of wind) and a trim mechanism that drives a steady state of the vertical loads on each landing gear to be equal to one another (i.e., indicating that the aircraft is not tipping or leaning in one direction). The FCC may determine the quick reacting component of the output command by operating in a first control mode (such as a PD control mode), and may determine the steady state component (i.e., the trim mechanism) of the output command by operating in a second control mode (such as PID control mode). By controlling the aircraft based on both landing gear forces and attitude feedback, and by outputting a command that includes both a quick reacting component and a steady state component, the FCC may maintain the aircraft in a steady state during gusty/turbulent conditions with minimal pilot input.

Figure 2:
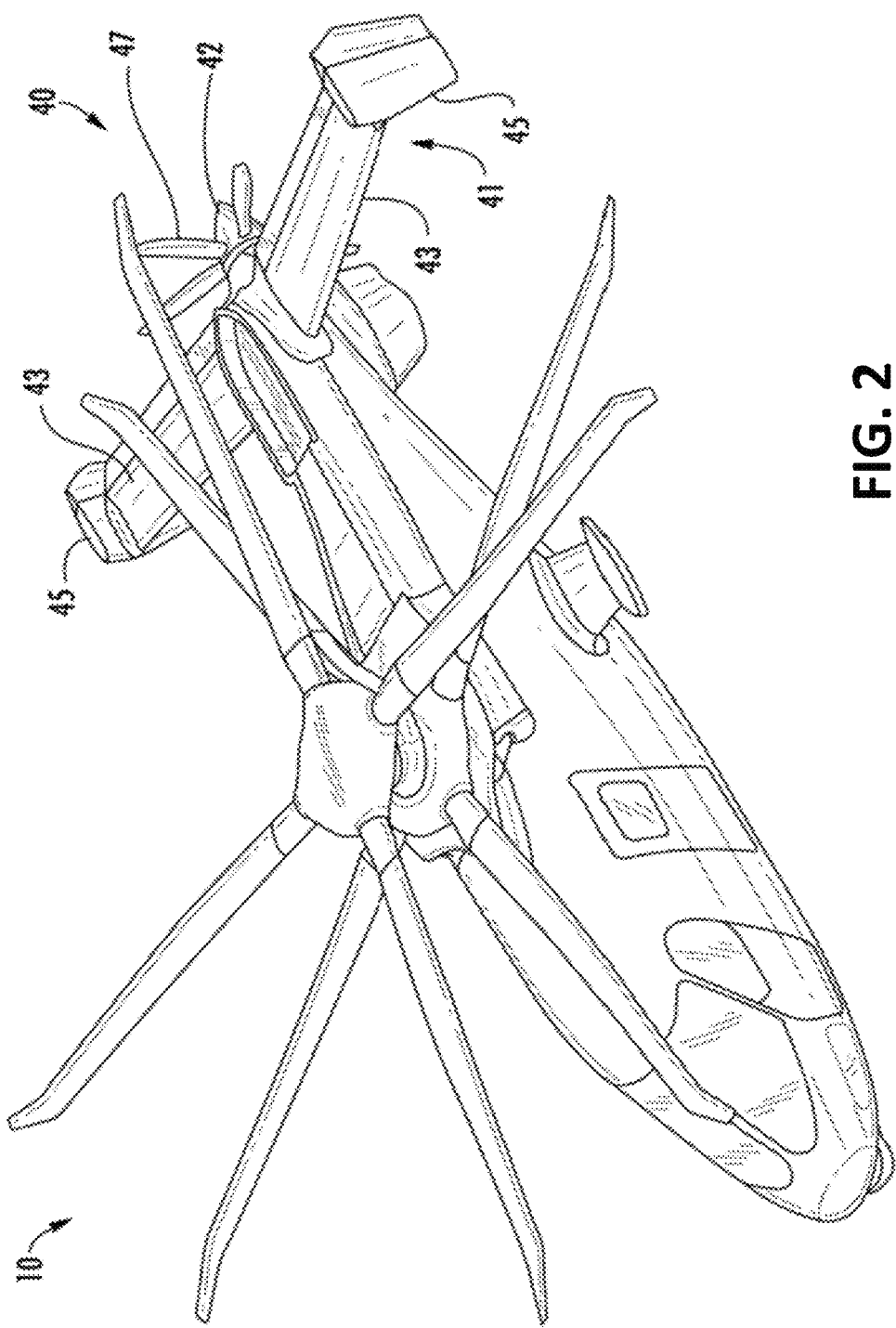
FIG. 2 depicts a perspective view of the rotary wing aircraft of FIG. 1.

FIGS. 1 and 2 depicts an embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. The main rotor assembly 18 is driven by a power source, for example, one or more engines 24 via a gearbox 26. In some embodiments, the aircraft 10 further includes a translational thrust system 40 located at the extending tail 14 to provide translational thrust (forward or rearward) for aircraft 10. Translational thrust system 40 includes a propeller 42 and is positioned at a tail section 41 of the aircraft 10. Additionally, the aircraft 10 may include landing gear assemblies 35 extending from below the airframe 12. The illustrated aircraft 10 includes two front landing gear assemblies 35 (right landing gear not shown in FIG. 1) and a rear landing gear assembly 35. In some embodiments, the landing gear assemblies 35 may be retractable. The landing gear assemblies 35 include wheels and struts, which may support the aircraft 10 when landed and enable the aircraft 10 to travel when on the ground.

The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. Any number of blades 36 may be used with the rotor assembly 18. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments. Although, the dual rotor system is depicted as coaxial, embodiments include dual rotor aircraft having non-coaxial rotors.

Figure 3:
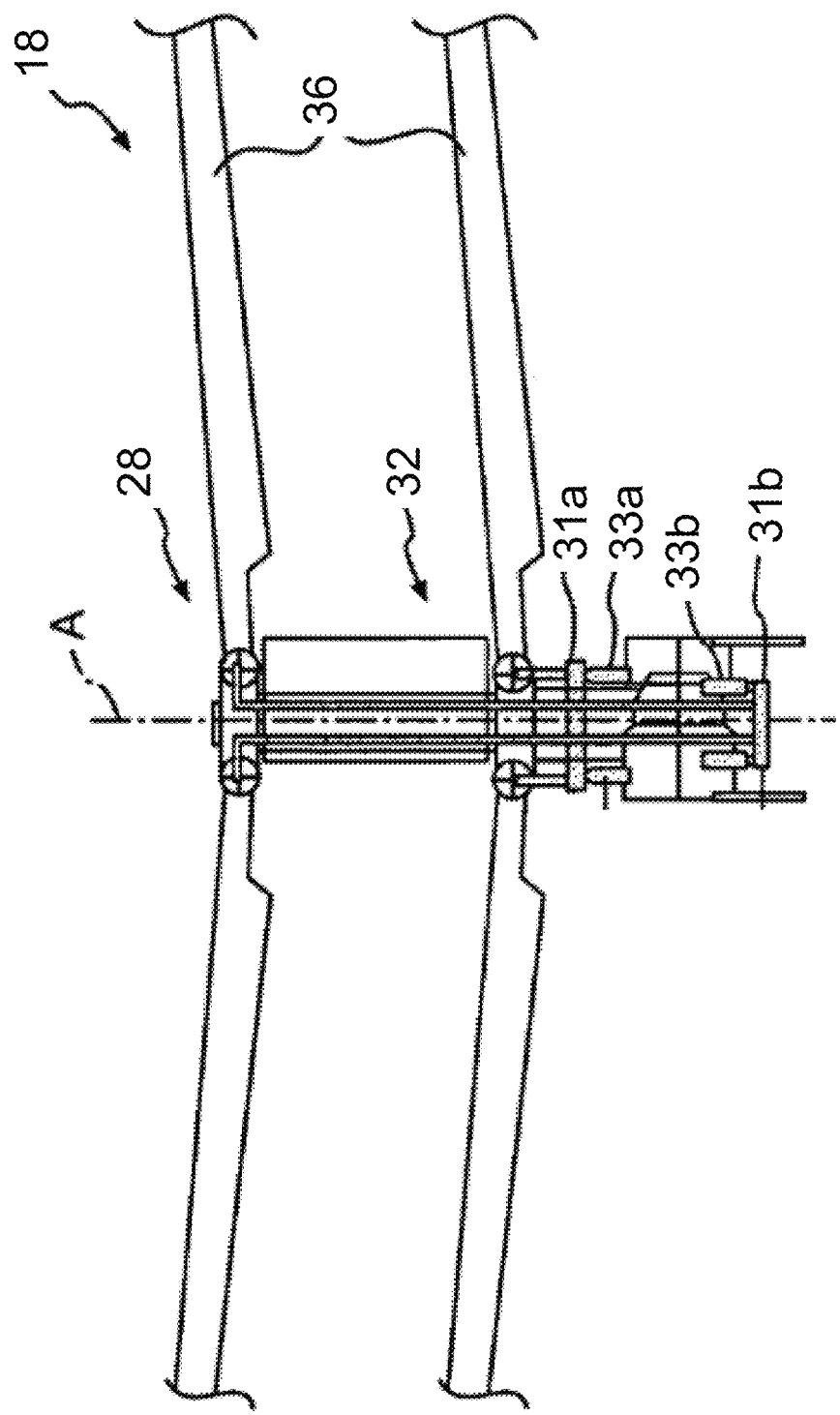
FIG. 3 is a schematic illustration of a rotor assembly for a rotary wing aircraft according to an exemplary embodiment.

Referring to FIG. 3, the upper rotor assembly 28 and the lower rotor assembly 32 may be independently controlled through a separate swashplate assembly 31a, 31b, which selectively articulates the upper rotor assembly 28 and the lower rotor assembly 32. Generally, motion of the swashplate assemblies 31a, 31b along the rotor axis A (i.e., translating along axis A) will cause the rotor blades 36 of the upper rotor assembly 28 and the lower rotor assembly 32 to vary pitch collectively. Tilting of the swashplate assemblies 31a, 31b with respect to the axis A will cause the rotor blades 20 to vary pitch cyclically and tilt the rotor disk. The swashplate assemblies 31a, 31b translate and/or tilt by a separate servo mechanism 33a, 33b, which selectively articulates upper rotor assembly 28 and the lower rotor assembly 32 independently in both cyclic and collective in response to a command from the flight control computer 124.

Referring back to FIG. 1, the translational thrust system 40 includes a propeller 42 with blades 47. In exemplary embodiments, the pitch of propeller blades 47 may be altered to change the direction of thrust (e.g., forward or rearward). The tail section 41 includes active elevators 43 and active rudders 45 as controllable surfaces. The propeller 42 is connected to and driven by the engine(s) 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of propeller 42. While shown in the context of a pusher-prop configuration, it is understood that the propeller 42 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 4:
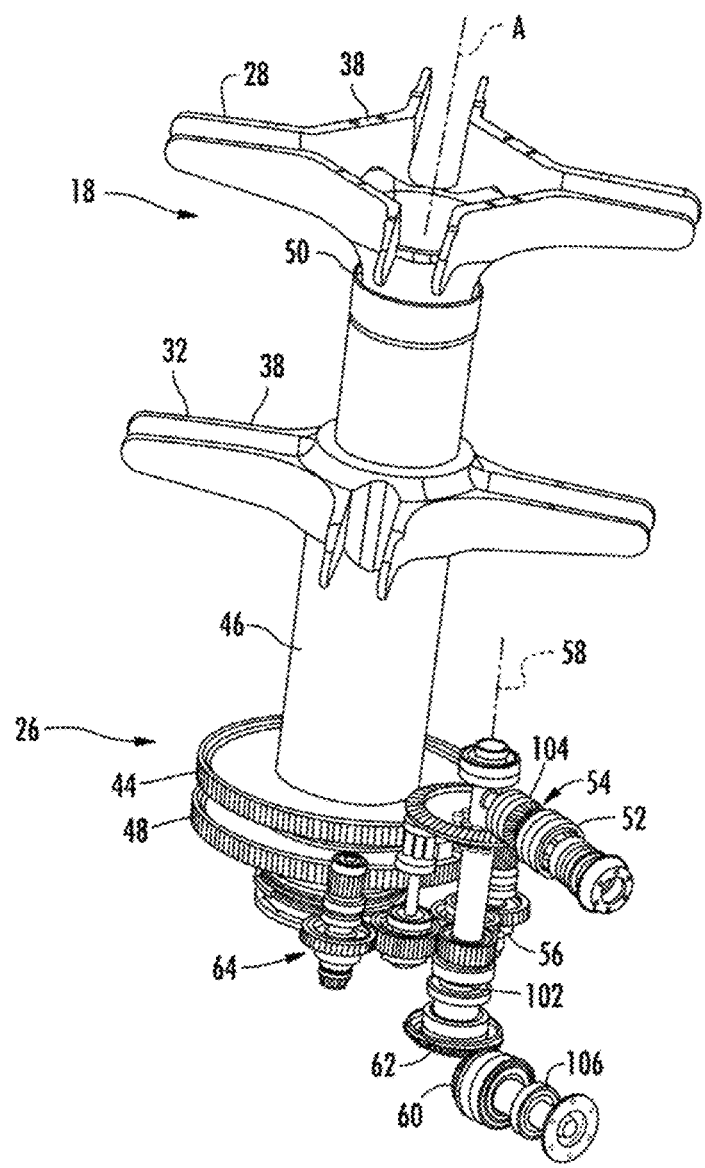
FIG. 4 is a perspective view of a gear train for a rotary wing aircraft according to an exemplary embodiment.

Shown in FIG. 4 is a perspective view of portions of main rotor assembly 18 and gearbox 26. The gearbox 26 includes an upper bull gear 44 that rotates about the main rotor axis, A, and is connected to the lower rotor assembly 32 via a lower rotor shaft 46 extending along the main rotor axis, A. A lower bull gear 48 rotates about the main rotor axis, A, and is connected to the upper rotor assembly 28 via an upper rotor shaft 50 extending along the main rotor axis, A, and through an interior of the lower rotor shaft 46. Torque and rotational speed are provided to the gearbox 26 via input shaft 52 that transmits the torque and rotational speed from the engine(s) 24 to an input bevel gear 54 disposed at an input bevel shaft 56 of the gearbox 26 via an input bevel pinion 104. In some embodiments, the input bevel shaft 56 rotates about an input bevel shaft axis 58 parallel to the main rotor axis A. The propeller 42 is driven by a propeller output shaft 106 driven by a propeller output gear 62 disposed at a quill shaft 102, or an extension of input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. While shown with the propeller output shaft 106 driven by the propeller output gear 62, it is understood that such elements could be removed where the propeller 42 is not used or is separately driven.

Figure 5:
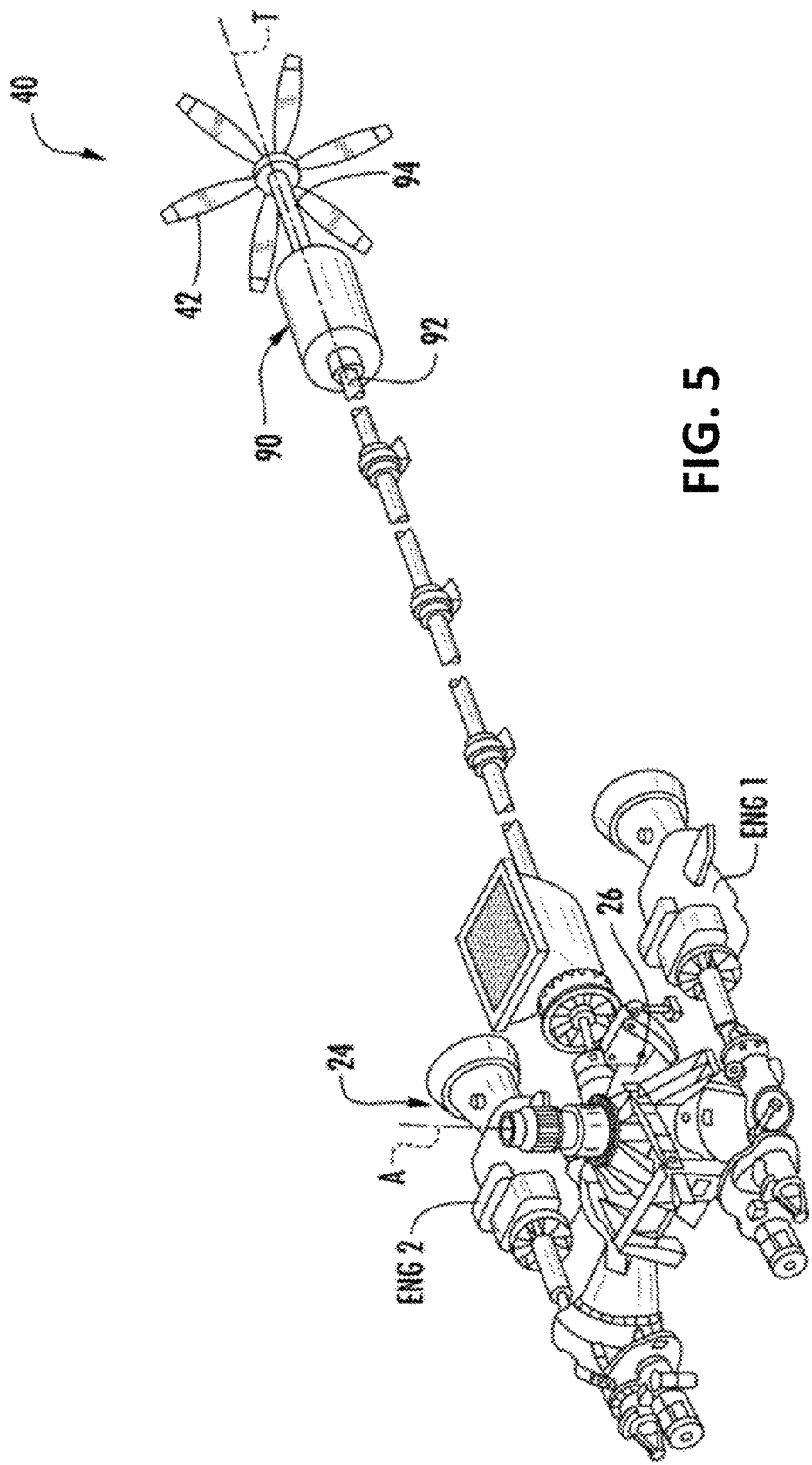
FIG. 5 is a perspective view of a gearbox and translational thrust system according to an exemplary embodiment.

Referring to FIG. 5, the main rotor assembly 18 is driven about the axis of rotation, A, through a main gearbox (MGB) 26 by a multi-engine powerplant system 24, having two engine packages ENG1, ENG2 in the example in FIG. 4. The multi-engine powerplant system 24 generates the power available for flight operations and couples such power to the main rotor assembly 18 and the translational thrust system 40 through the MGB 26. The MGB 26 may be interposed between the powerplant system 24, the main rotor assembly 18 and the translational thrust system 40. A portion of the drive system downstream of the MGB 26 includes a combined gearbox 90 (also referred to as a clutch). The combined gearbox 90 selectively operates as a clutch and a brake for operation of the translational thrust system 40 with the MGB 26. The combined gearbox 90 also operates to provide a rotor brake function for the main rotor assembly 18.

The combined gearbox 90 generally includes an input 92 and an output 94 generally defined along an axis parallel to rotational axis, T, The input 92 is generally upstream of the combined gearbox 90 relative the MGB 26 and the output 94 is downstream of the combined gearbox 90 and upstream of the pusher propeller system 40 (FIG. 2). The combined gearbox 90 may be categorized by the technique used to disengage-engage (e.g., clutch) or stop (e.g., brake) the load such as friction, electromagnetic, mechanical lockup, etc., and by the method used to actuate such as mechanical, electric, pneumatic, hydraulic, self-activating, etc. It should be understood that various combined gearbox 90 systems may be utilized to include, but not to be limited to mechanical, electrically, hydraulic and various combinations thereof.

Figure 6:
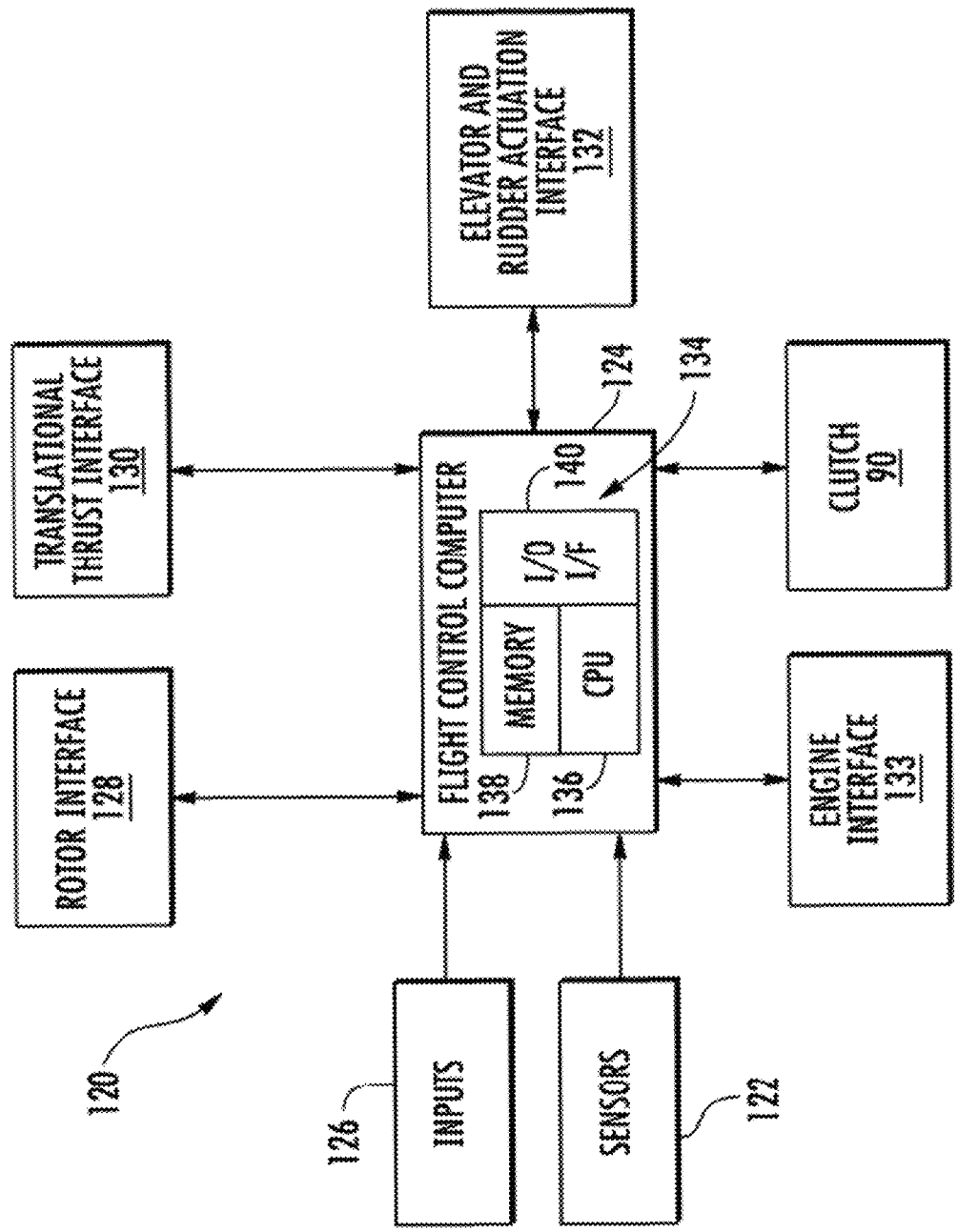
FIG. 6 depicts a flight control system according to an exemplary embodiment.

Portions of the aircraft 10 are controlled by a flight control system 120 illustrated in FIG. 6. In one embodiment, the flight control system 120 is a fly-by-wire (FBW) control system. In a FBW control system there is no direct mechanical coupling between a pilot's controls and movable components of aircraft 10. Instead of using mechanical linkages, a FBW control system includes a plurality of sensors and/or inertial measurement units (IMUs) and/or embedded GPS/IMU (EGI) (hereinafter referred to as "sensors 122"), which can sense various flight conditions of the aircraft 10, such as the speed of the aircraft 10, wind speeds surrounding the aircraft 10, the position of controlled elements and generate electrical signals proportional to the sensed position. The sensors 122 may also be used directly and indirectly to provide a variety of aircraft state data or flight state data to a flight control computer (FCC) 124. The sensors 122 may also be used to directly and indirect provide aircraft attitude data to the FCC 124. Furthermore, the sensors 122 may provide data related to the stability of the aircraft 10, for example, while in a landed state.

In some embodiments, the aircraft 10 includes landing gear sensors 122a positioned on each of the landing gear assemblies 35. The landing gear sensors 122a may be force sensors, pressure sensors, weight on wheel (WOW) sensors, load cells, strain gauges, or other types of sensors capable of operating in accordance with the systems and method disclosed herein. The landing gear sensors 122a may be selected from these different types of sensors in order to accomplish different purposes. For example, when the landing gear sensors 122a are force sensors or pressure, they may be configured to sense a force or pressure on the landing gear and provide the sensed parameter to the FCC for further computation or control. In other words, these types of sensors sense a specific parameter (i.e., such as force or pressure) within a possible range for the parameter. However, when the landing gear sensors 122a are WOW sensors, strain gauges, or proximity sensors, the sensor may simply provide an indication of whether the aircraft is in a landed state. These types of sensors may act as a binary sensor (or a switch) that indicates "on" or "off" the ground rather than providing a sensed parameter within a range of options. Accordingly, the WOW sensors may provide the FCC with an indication of whether or not the aircraft is in a landed flight state while the force sensors may provide the FCC with more specific parameters that may be used to help control the aircraft.

In some embodiments, the landing gear sensors 122a may provide data to the FCC 124 to help determine the flight state of the aircraft 10, including whether the aircraft is in an "in-air state," a "transition state," or a "landed state." The landing gear sensors 122a may also provide data to the FCC 124 related to the stability of the aircraft 10. One or more landing gear sensors 122a may be included on each of the landing gear assemblies 35. In some embodiments, the aircraft 10 may include more than one landing gear sensor 122a on each landing gear assembly 35. For example, each landing gear assembly 35 may include a WOW sensor to help identify the flight state of the aircraft 10 (e.g., in flight or landed) and a force sensor to provide data related to the stability of the aircraft 10. In other embodiments, different combinations of sensors are positioned on the landing gear assemblies 35.

Additionally, the aircraft 10 may further include airframe sensors 122b positioned on the airframe 12. The airframe sensors 122b may be Inertial measuring units (IMUS), embedded GPS/IMUS (EGIs), or other sensors capable of operating in accordance with the systems and methods disclosed herein. The airframe sensors 122b may sense parameters indicative of the attitude of the aircraft 10. For example, the airframe sensors 122b may sense parameters related to pitch, roll, and/or yaw of the aircraft 10. Similarly, the airframe sensors 122a may also provide data related to the stability of the aircraft. In some embodiments, the aircraft 10 may include multiple airframe sensors 122a on the airframe 12 to provide information on the attitude and/or stability of the aircraft 10.

The FCC 124 may also receive inputs 126 as control commands from various sources. For instance, the inputs 126 can be pilot inputs, auto-pilot inputs, navigation system based inputs, or any control inputs from one or more control loops executed by the FCC 124 or other subsystems. The inputs 126 from the pilot may be initiated through various input devices, such as control actuators and buttons, collective stick, cyclic controls, and the like. In response to inputs from the sensors 122 and inputs 126, the FCC 124 transmits signals to various subsystems of the aircraft 10.

Flight control system 120 may include a rotor interface 128 configured to receive commands from the FCC 124 and control one or more actuators, such as a mechanical-hydraulic or electric actuators, for the upper rotor assembly 28 and lower rotor assembly 32. In an embodiment, inputs 126 including cyclic, collective, pitch rate, and throttle commands that may result in the rotor interface 128 driving the one or more actuators to adjust upper and lower swashplate assemblies (not depicted) for pitch control of the upper rotor assembly 28 and lower rotor assembly 32. Alternatively, pitch control can be performed without a swashplate assembly using individual blade control (IBC) in the upper rotor assembly 28 and lower rotor assembly 32. The rotor interface 128 can manipulate the upper rotor assembly 28 and lower rotor assembly 32 independently. This allows different collective and cyclic commands to be provided to the upper rotor assembly 28 and lower rotor assembly 32.

Flight control system 120 may include a translational thrust interface 130 configured to receive commands from the FCC 124 to control one or more actuators, such as a mechanical-hydraulic or electric actuators, for the control of the translational thrust system 40. In an embodiment, inputs 126 may result in the translational thrust interface 130 controlling speed of propeller 42, altering the pitch of propeller blades 47 (e.g., forward or rearward thrust), altering the direction of rotation of propeller 42, controlling gearbox 90 to employ a clutch to engage or disengage the propeller 42, etc.

Flight control system 120 may include an elevator and rudder actuation interface 132. The elevator and rudder actuation interface 132 is configured to receive commands from the FCC 124 to control one or more actuators, such as a mechanical-hydraulic or electric actuators, for the active elevator 43 and/or active rudders 45 of FIG. 2. In an embodiment, inputs 126 include an elevator pitch rate command for the elevator and rudder actuation interface 132 to drive the one or more actuators for pitch control of the active elevators 43 of FIG. 2. In an embodiment, inputs 126 include a rudder command for the elevator and rudder actuation interface 132 to drive the one or more actuators for positional control of the active rudders 45 of FIG. 2.

Flight control system 120 may include an engine interface 133. The engine interface 133 is configured to receive commands from the FCC 124 to control engine(s) 24. In an embodiment, inputs 126 include a throttle command from the pilot to adjust the RPM of engine(s) 24. FCC 124 may also send commands to engine interface 133 to control the engine(s) in certain predefined operating modes (e.g., quiet mode).

The FCC 124 includes a processing system 134 that applies models and control laws to augment commands based on aircraft state data. The processing system 134 includes processing circuitry 136 (i.e., a central processing unit), memory 138, and an input/output (I/O) interface 140. The processing circuitry 136 may be any type or combination of computer processors, such as a microprocessor, microcontroller, digital signal processor, application specific integrated circuit, programmable logic device, and/or field programmable gate array, and is generally referred to as central processing unit (CPU) 136. The memory 138 can include volatile and non-volatile memory, such as random access memory (RAM), read only memory (ROM), or other electronic, optical, magnetic, or any other computer readable storage medium onto which data and control logic as described herein are stored. Therefore, the memory 138 is a tangible storage medium where instructions executable by the processing circuitry 136 are embodied in a non-transitory form. The I/O interface 140 can include a variety of input interfaces, output interfaces, communication interfaces and support circuitry to acquire data from the sensors 122, inputs 126, and other sources (not depicted) and communicate with the rotor interface 128, the translation thrust interface 130, tail faring interface 132, engine interface 133, and other subsystems (not depicted). The CPU 136 is configured to retrieve instructions and data from the memory 138 and execute, among other things, the instructions to perform the methods described herein. Furthermore, the CPU 136 is configured to receive data from the I/O interface 140, such as data from the sensors 122 and inputs 126, to perform the methods described herein.

In exemplary embodiments, the rotor interface 128, under control of the FCC 124, can control the upper rotor assembly 28 and lower rotor assembly 32 to pitch in different magnitudes and/or different directions at the same time. This includes differential collective, where the upper rotor assembly 28 has a collective pitch different than the collective pitch of the lower rotor assembly 32, in magnitude and/or direction. Differential pitch control also includes differential cyclic pitch control, where the upper rotor assembly 28 has a cyclic pitch different than the cyclic pitch of the lower rotor assembly 32, in magnitude, axis of orientation (e.g., longitudinal or lateral) and/or direction. The differential collective and the differential cyclic pitch control may be accomplished using independently controlled swashplates in the upper rotor assembly 28 and lower rotor assembly 32. Alternatively, differential collective and the differential cyclic pitch control may be accomplished using individual blade control in the upper rotor assembly 28 and the lower rotor assembly 32.

Some aircraft, such as rigid rotor aircraft or coaxial dual rotor aircraft, have a strong response to external forces like gusts of winds. Therefore, the pilot must be actively controlling the aircraft at all times, even in moderate conditions or relatively low winds.

Accordingly, provided herein is a system and method of controlling the aircraft to reduce pilot workload during moderate external conditions, such as wind gusts. As described herein, the FCC may control the aircraft based on sensed forces from the landing gear assemblies in addition to one or both attitude feedback and rate gyro feedback from an airframe sensor. For example, the sensed forces may include vertical forces on each of the three landing gear assemblies. The attitude feedback and/or the rate gyro feedback may include sensed parameters from one or more airframe sensor related to pitch or roll of the aircraft. By controlling the aircraft based on both landing gear forces and attitude feedback, the FCC may maintain the aircraft in a steady state during gusty/turbulent conditions.

Furthermore, the FCC may maintain the stability of the aircraft by creating an output command to the rotor interface, which includes a quick reacting component in response to the disturbance (e.g., the gust of wind) and a trim mechanism that drives a steady state of the vertical loads on each landing gear to be equal to one another (i.e., indicating that the aircraft is not tipping or leaning in one direction). In some embodiments, the FCC may determine the quick reacting component associated with the PD of both the landing gear and airframe sensors. The FCC may determine the steady state component of the output command via the integral (I) portion of the landing gear force sensors.

Figure 7:
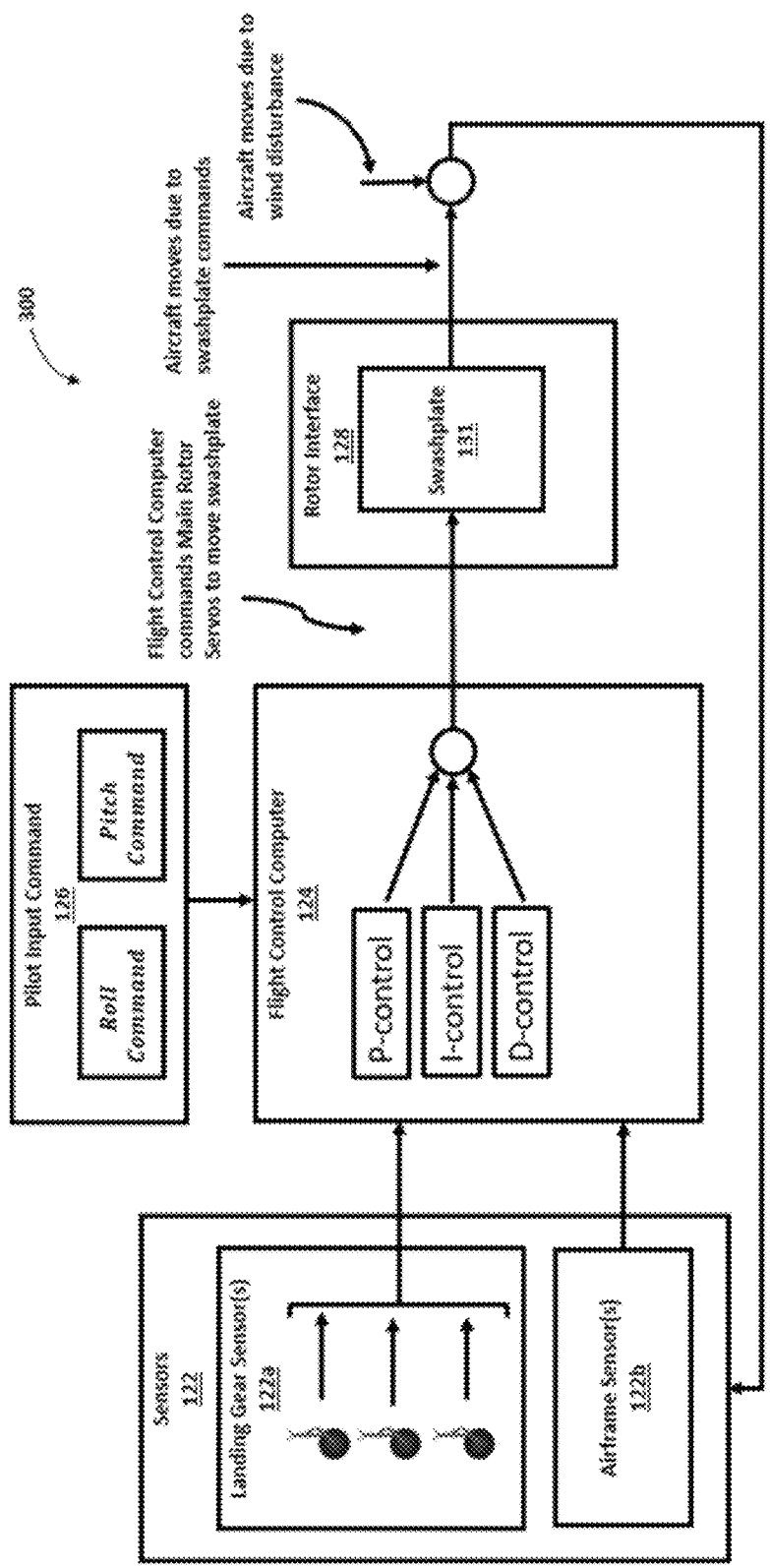
FIG. 7 depicts a portion of the flight control system of FIG. 6 according to an exemplary embodiment.

As an exemplary embodiment, the FCC 124 is configured to operate according to a control loop 300, which is shown schematically in FIG. 7. The FCC 124 receives a pilot input 126 related to roll and/or pitch of the aircraft. For example, the pilot input 126 may include a gear roll moment command, a roll rate command, or a roll angle command. Similarly, the pilot input 126 may include a gear pitch moment command, a pitch rate command, or a theta command. As will be understood, the pilot input 126 may also include a combination of one or more roll and pitch commands. The pilot input 126 is indicative of a setpoint (e.g., a desired value) related to one or both roll and pitch of the aircraft 10. Furthermore, in the illustrated control loop 300, the FCC 124 receives one or more inputs from the sensors 122. For example, the sensor inputs may include sensed data from one or both of the landing gear sensors 122a and the airframe sensors 122b related to the moment and/or attitude of the aircraft 10. Thereafter, FCC 124 outputs a command to one of the control interfaces 128, 130, 132, 133 to control the aircraft 10 based on the received pilot input 126 and sensed data from the sensors 122. In the illustrated embodiment, the FCC 124 outputs a command to the rotor interface 128 to control the main rotor assembly 18. The FCC 124 continually adjusts the output command based on an error between the setpoint and the sensed data. In other words, the FCC 124 targets the setpoint as the desired value, and adjusts the output command by adding a correction factor to the output command in order to account for error between the setpoint and the sensed data.

The FCC 124 may use one or more type of correction factor to determine the output command. For example, the FCC 124 may use a proportional correction factor (i.e., P-control), an integral correction factor (i.e., I-control), a derivative correction factor (i.e., D-control), or a combination thereof. When using a proportional correction factor, the FCC 124 linearly correlates the output command to the error between the sensed data and the setpoint. When using an integral correction factor, the FCC 124 correlates the output command to the integral of the error over a predetermined period of time. When using a derivative correction factor, the FCC 124 correlates the output command to the derivative of the error.

As mentioned, these correction factors may be used in combination with one another. The combination of correction factors being used by the FCC 124 is based on the control mode that the FCC 124 is operating in. For example, the FCC 124 may operate in a PID control mode in which all three correction factors are being applied. When in PID control mode, the FCC 124 uses a P-control, an I-control, and a D-control to determine the output command. Similarly, the FCC 124 may operate in a PD control mode in which only the proportional correction factor and the derivative correction factor are applied to the output command. In other embodiments the FCC 124 may use different combinations of correction factors and different control modes to control the aircraft 10.

Furthermore, in some embodiments, the FCC 124 may switch from one control mode to another control mode depending on various conditions or flight state. In one embodiment, the FCC 124 may operate in a first control mode (e.g., PID control mode) during a first flight state (e.g., in an air flight state), and may switch to a second control mode (e.g., PD control mode) during a second flight state (e.g., transition flight state or landed flight state). In some embodiments, the FCC 124 may automatically switch from one control mode to another control mode when the aircraft 10 changes flights states. The FCC 124 may receive signals from one or more sensor 122 indicating when the flight state of the aircraft 10 has changed, and thereby change control modes. As an exemplary embodiment, landing gear sensors 122a may send signals to the FCC 124 indicating when the aircraft is in a landed flight state, a transition flight state, or an in-air flight state. For example, when landing gear sensors 122a, such as WOW sensors, indicate that all three landing gear assemblies 35 have touched down, the FCC 124 may determine that the aircraft 10 is in a landed flight state and may operate according to a first control mode. When the landing gear sensors 122a send signals to the FCC 124 indicating that at least one landing gear assembly 35 has touched down and at least one landing gear assembly 35 is off the ground, the FCC 124 may determine that the aircraft 10 is in a transition flight state, and may operate according to a second control mode. Likewise, when the landing gear sensors 122a send signals to the FCC 124 indicating that all three landing gear assemblies 35 are off the ground, the FCC 124 may determine that the aircraft 10 is in an in-air flight state, and may operate according to a third control mode. As will be understood, the FCC 124 may operate in the same control mode in some of the flight states and may operate in different control modes in some of the flight states.

Figure 8:
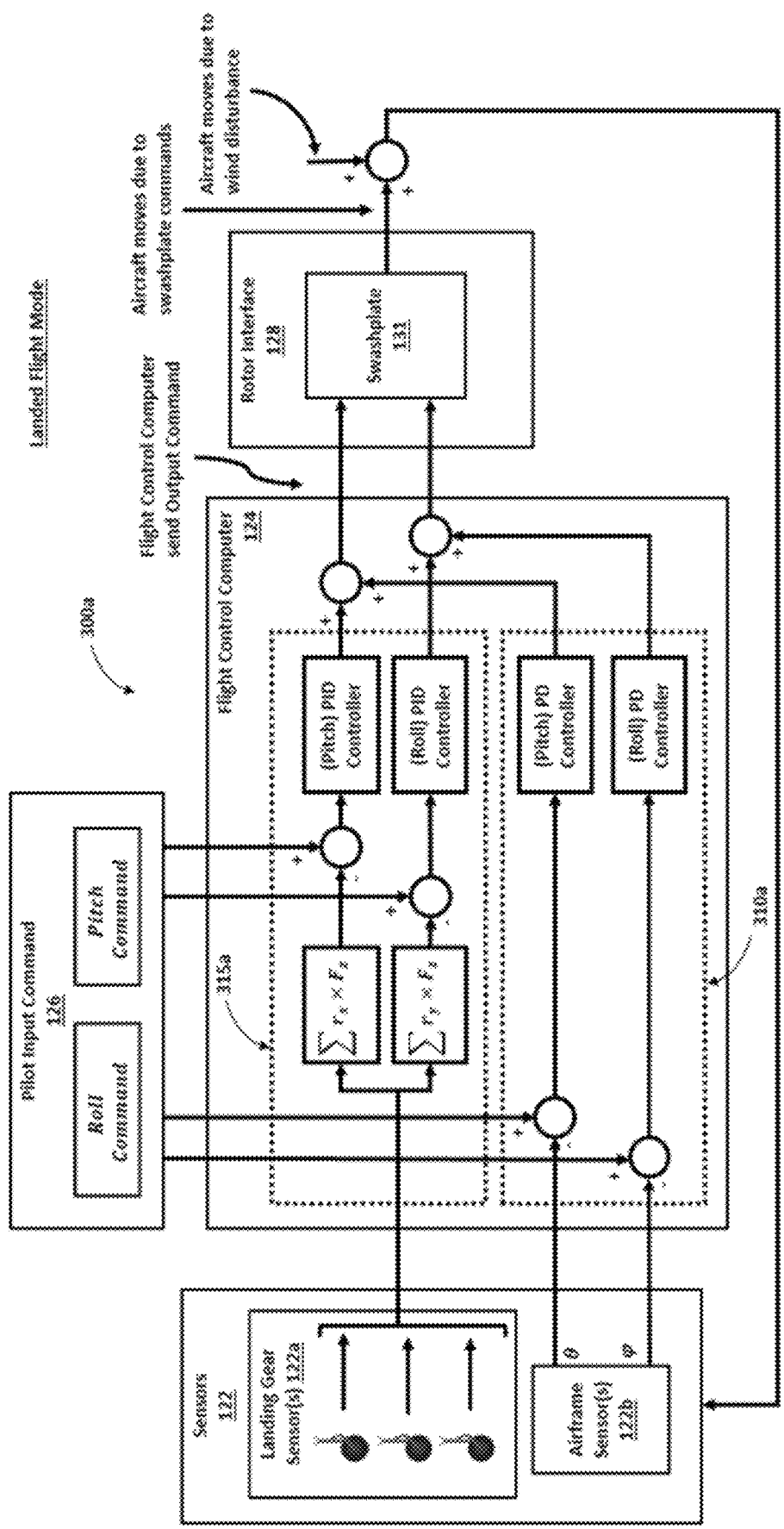
FIG. 8 depicts an exemplary embodiment of a control loop for a flight control system when a rotary wing aircraft is in a landed flight state.

FIG. 8 depicts an exemplary embodiment of a control loop 300a for the FCC 124 when the aircraft 10 is in a landed state. The FCC 124 may operate according to a control loop 300a having a first control sub-loop 310a and a second control sub-loop 315a. In an exemplary embodiment, the first control sub-loop 310a operates based, at least in part, on one or more pilot input 126 and data provided by the airframe sensors 122b. For example, the first control sub-loop 310a controls the aircraft 10 based, at least partially, on pilot inputs related to pitch and/or roll, as well as aircraft attitude data (e.g., roll and pitch) obtained from the airframe sensors 122b. The second control sub-loop 315a operates based, at least in part, on one or more pilot input 126 and data provided by the landing gear sensors 122a. For example, the second control sub-loop 315a controls the aircraft 10 based, at least partially, on pilot inputs 126 related to pitch and/or roll, as well as the moment data of the aircraft 10 obtained from the landing gear sensors 122a. The FCC 124 combines data from the first control sub-loop 310a and the second control sub-loop 315a to provide an output command to control the aircraft 10.

Although FIG. 8 illustrates multiple signals coming from the sensors and the pilot inputs, it should be understood that this is illustrative only, and does not necessarily represent the actual number of signals being sent from the pilot or the sensors. The FCC 124 receives signals from one or more pilot input 126 and one or more sensor 122, which are used in the control loop 300a. The exact number of signals being sent to the FCC from the pilot input 126 and the sensors 122 is dependent on the particular flight control system. Additionally, although FIG. 8 illustrates separate pilot inputs 126 feeding into the first control sub-loop 310a and the second control sub-loop 315a, it should be understood, that the same pilot input 126 may be feeding into both the first control sub-loop 310a and the second control sub-loop 315a. Likewise, the signals from the landing gear sensors 122a and the airframe sensors 122b may be used in one or both the first control sub-loop 310a and the second control sub-loop 315a.

Figure 9:
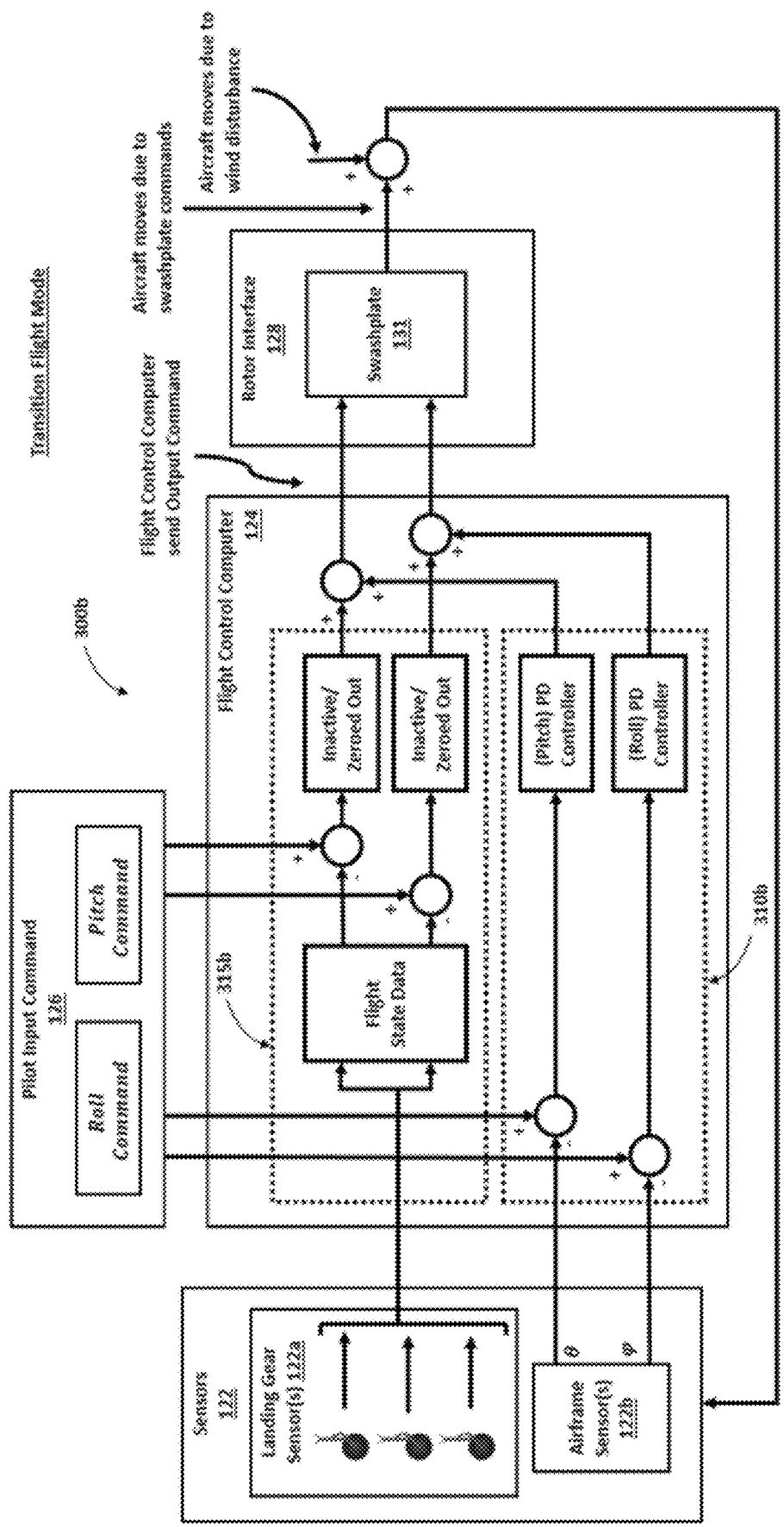
FIG. 9 depicts an exemplary embodiment of a control loop for a flight control system when a rotary wing aircraft is in a transition flight state.
Figure 10:
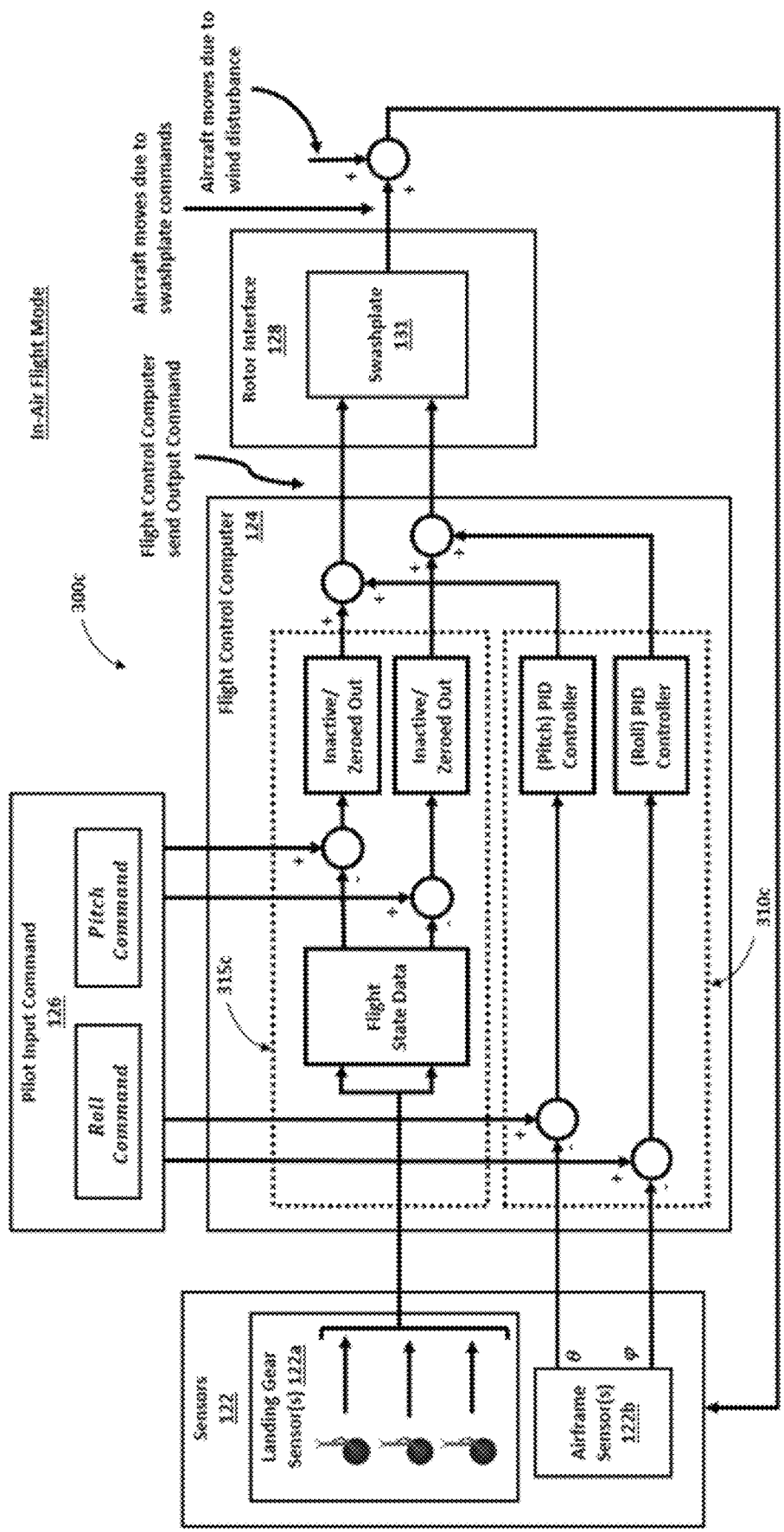
FIG. 10 depicts an exemplary embodiment of a control loop for a flight control system when a rotary wing aircraft is in an in-air flight state.

Referring to FIGS. 8-10, one or both the first control sub-loop 310 and the second control sub-loop 315 may be active at the same time. In this exemplary embodiment, the first control sub-loop 310 is active during all flight states, including in-air, transition, and landed flight states, while the second control sub-loop 315 is active only during a landed flight state. In this embodiment, the second control sub-loop 315 is inactive (or only partially active) during the in-air and transition flight state. In other embodiments, the second control sub-loop 315 may be active during the transition and in-air flight states. Likewise, in other embodiments, the first control sub-loop 310 may be inactive during one or more flight state.

When a control sub-loop is active, the sub-loop contributes data to the FCC 124 that is used to determine the output command to control the aircraft 10. More specifically, when a control sub-loop is active, it contributes data that is used by the FCC 124 to calculate a correction factor (i.e., P-control, I-control, and/or D-control) to adjust the output command and target the setpoint indicated by the pilot input 126. In other words, an active control sub-loop provides data to the FCC 124, which is ultimately used in the calculation of the output command to the rotor interface 128 to control the swashplate assembly 131.

When a control sub-loop is inactive, the sub-loop may either contribute no data to the FCC 124 or may contribute a "zero" or "null" factor to the correction factor calculation. In some embodiments, when a control sub-loop is inactive, it may still contribute data to the FCC 124 for other purposes. For example, in some embodiments, an inactive sub-loop may still contribute data to the FCC 124 to determine a flight state of the aircraft 10 or a desired control mode for the FCC 124 to operate in.

In the embodiment illustrated in FIGS. 8-10, the second control sub-loop 315 is active during the landed flight state (FIG. 8), and is inactive during the transition flight state (FIG. 9) and the in-air flight state (FIG. 10). When the second control sub-loop 315 is inactive, it may still contribute data to the FCC 124 which is used to determine the flight state of the aircraft 10, and thereby, the control mode the FCC 124 should operate in. For example, the second control sub-loop 315 may still provide information to the FCC 124 indicating whether any of the landing gear assemblies 35 have touch down. However, when the second control sub-loop 315 is inactive, it contributes either no data or a zero value to the FCC 124 in determining the correction factor to be used in the output command to the rotor interface 128.

Referring to FIGS. 8-10, in addition to the control sub-loops being active or inactive in different flight states, the control sub-loops may operate in different control modes when the aircraft is in different flight states. As a preliminary note, the FCC 124 may receive signals from various sensors 122 to help determine what flight state the aircraft is in. For example, the FCC 124 may receive signals form landing gear sensors 122b indicating that all of the landing gear assemblies 35 have touched down and the aircraft is in a landed state.

FIG. 8 schematically illustrates a control loop 300 of the FCC 124 when in a landed flight state. As shown, both the first control sub-loop 310a and the second control sub-loop 315a are active during the landed flight state. Therefore, the FCC 124 uses data from both control sub-loops to determine a correction factor to adjust the output command to the rotor interface 128. Additionally, when in the landed flight state, the FCC 124 operates the first control sub-loop 310a and the second control sub-loop 315a according to different control modes. For example, the FCC 124 operates the first control sub-loop 310a in a PD control mode using proportional and differential correction factors when calculating the error value used to adjust the output command. The FCC 124 operates the second control sub-loop 315a in a PID control mode using proportional, integral, and differential correction factors when calculating the error value used to adjust output command. Furthermore, when calculating the output command, the FCC 124 combines a first error value from the first control sub-loop 310a with a second error value from the second control sub-loop 315a.

Therefore, the output command from the FCC 124 is based on both a PD-control and a PID control. The PD control component may be a quick response component of the output command, which can react quickly to a disturbance. More specifically, the FCC may determine the quick reacting component of the output command by operating in a PD control mode using feedback from an airframe sensor related to roll rate, roll attitude, pitch rate, pitch attitude, or a combination thereof. The PID control component may be a steady state component of the output command, which may be used to maintain a steady state of aircraft by maintaining equal forces on each of the landing gear assemblies 35 (i.e., indicating that the aircraft is not tipping or leaning in one direction). More specifically, the FCC may determine the steady state component of the output command by operating in a PID control mode using feedback from the landing gear sensors related to force on each of the three landing gear assemblies and/or momentum of the aircraft.

FIG. 9 illustrates a control loop 300*b* of the FCC 124 when in a transition flight state. As shown, the first control sub-loop 310*b* is active and the second control sub-loop 315*b* is inactive. Therefore, the FCC 124 uses data from the first control sub-loop 310*b* to determine a correction factor to adjust the output command to the rotor interface 128. Additionally, when in a transition flight state, the FCC 124 operates the first control sub-loop 310*b* according to a PD control mode using proportional and differential correction factors when calculating the error value used to adjust the output command. Since the second control sub-loop 315*b* is inactive in this flight state, the FCC 124 either receives no data to contribute to the calculation of the output command or receives a zero value to contribute to the calculation of the output command. Although the second control sub-loop 315*b* is inactive in the transition flight state, the second control sub-loop 315*b* may still contribute information to the FCC 124 indicative of the flight state of the aircraft 10.

FIG. 10 illustrates a control loop 300*c* of the FCC 124 when in an in-air flight state. As shown, the first control sub-loop 310*c* is active and the second control sub-loop 315*c* is inactive. Therefore, the FCC 124 uses data from the first control sub-loop 310*c* to determine a correction factor to adjust the output command to the rotor interface 128. Additionally, when in a transition flight state, the FCC 124 operates the first control sub-loop 310*c* according to a PID control mode using proportional, integral, and differential correction factors when calculating the error value used to adjust the output command. Since the second control sub-loop 315*c* is inactive in this flight state, the FCC 124 either receives no data to contribute to the calculation of the output command or receives a zero value to contribute to the calculation of the output command. Although the second control sub-loop 315*c* is inactive in the in-air flight state, the second control sub-loop 315*c* may still contribute information to the FCC 124 indicative of the flight state of the aircraft 10.

Figure 11:
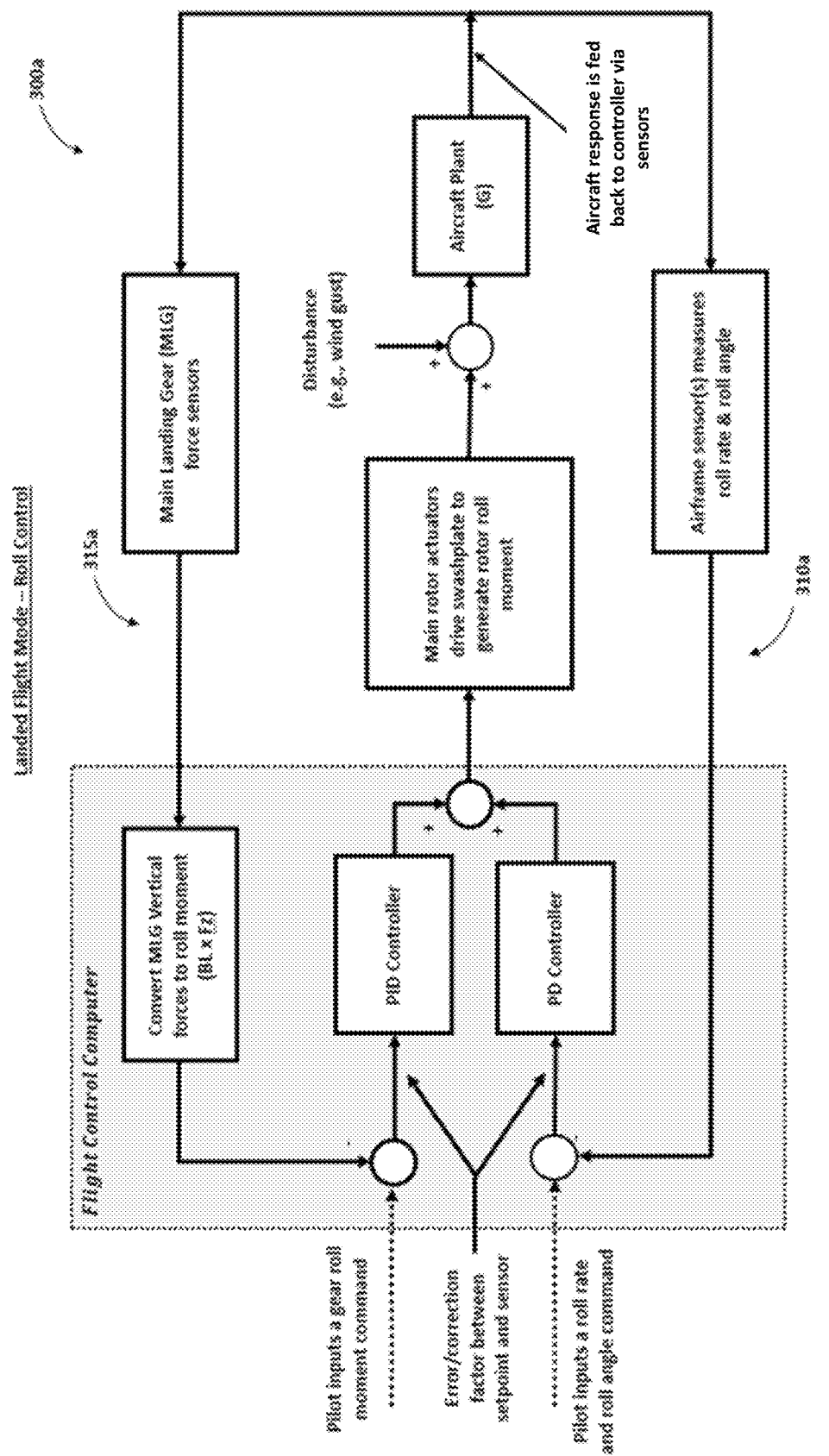
FIG. 11 depicts an exemplary embodiment of a control loop for controlling roll of a rotary wing aircraft when the aircraft is in a landed flight state.
Figure 12:
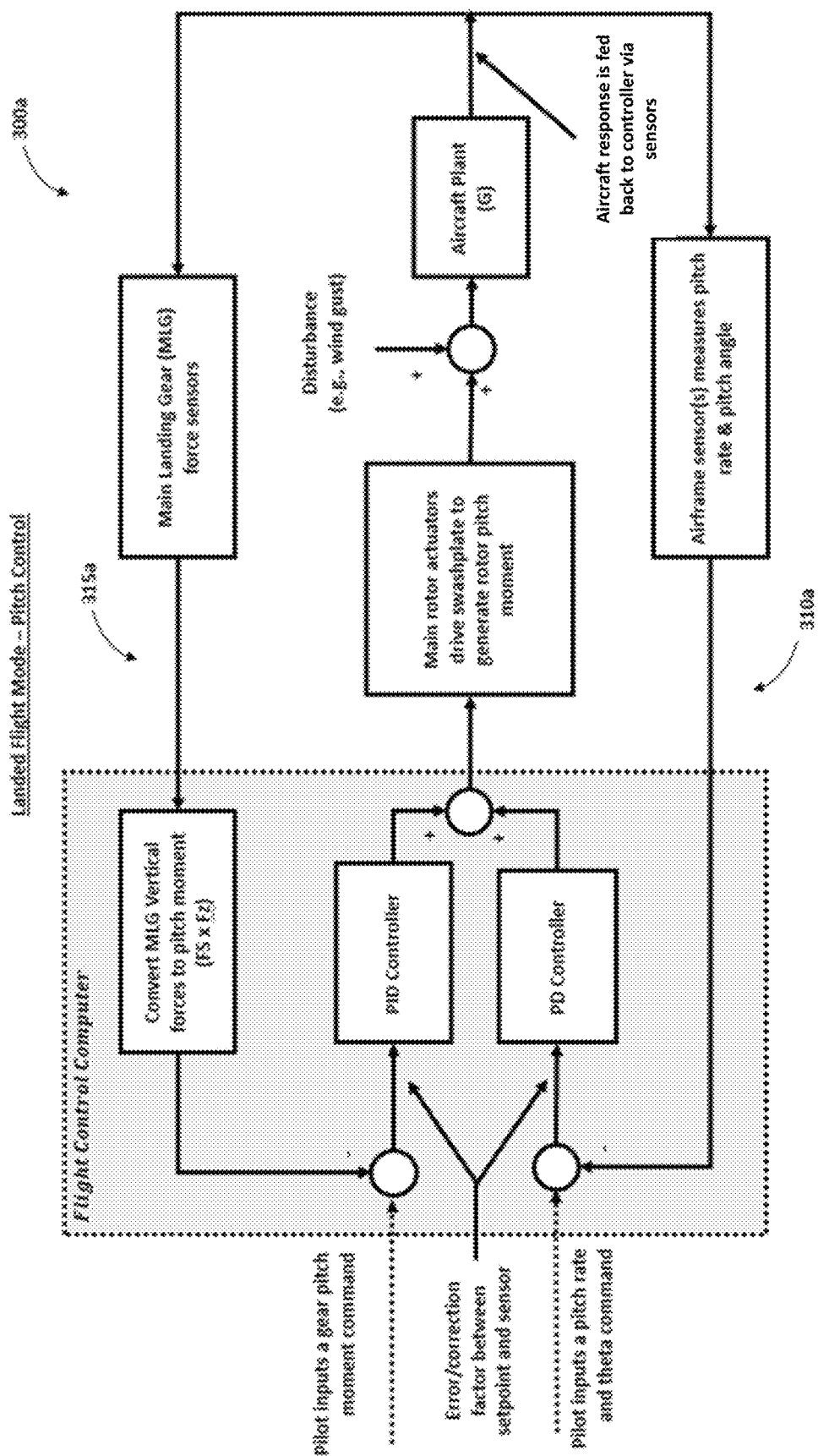
FIG. 12 depicts an exemplary embodiment of a control loop for controlling pitch of a rotary wing aircraft when the aircraft is in a landed flight state.
Figure 13:
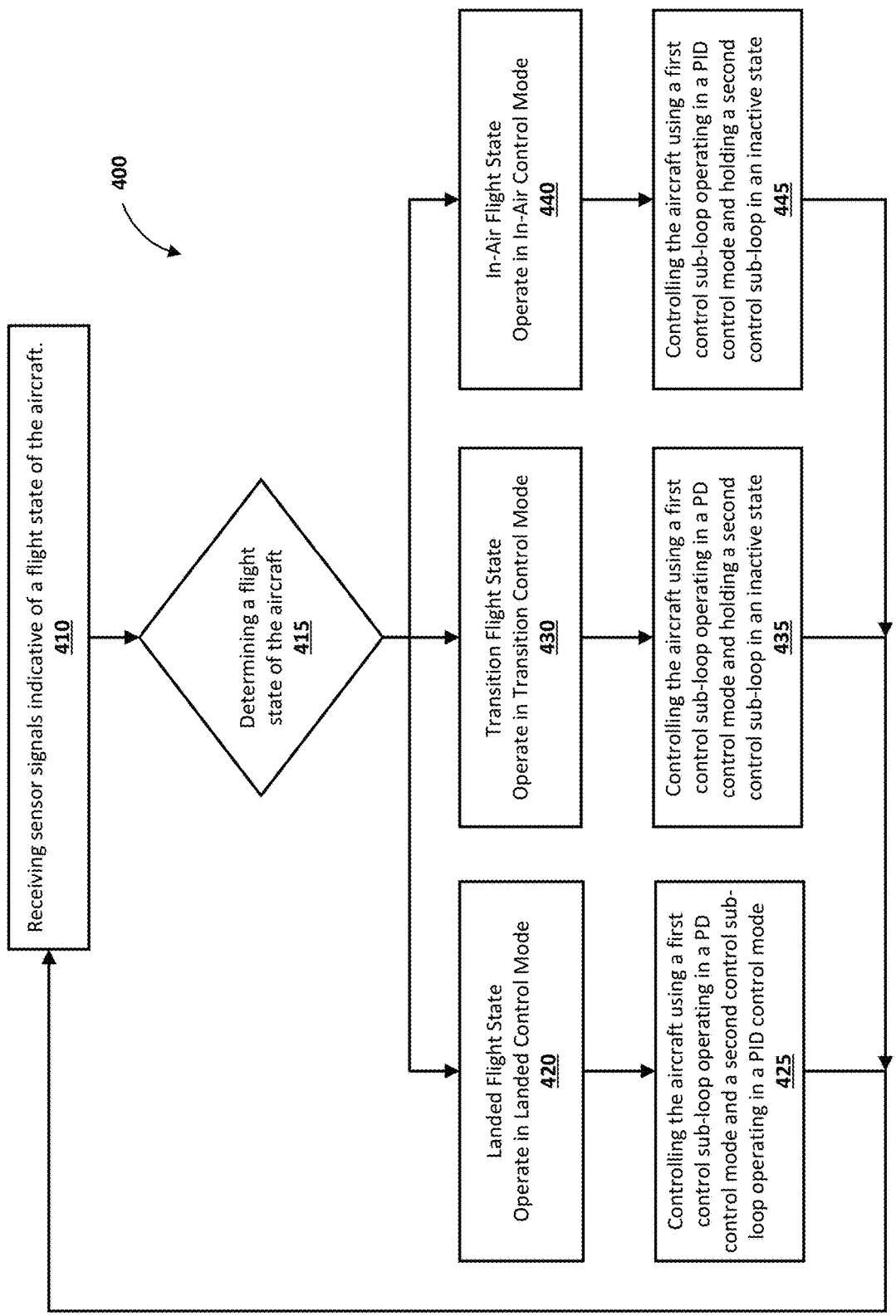
FIG. 13 depicts a flow chart for a flight control system.

FIGS. 11-12 provide exemplary embodiments of a control loop 300 executed by the FCC 124 when the aircraft 10 is in a landed flight state. The control loops illustrated in FIGS. 11 and 12 are broken up into a roll control loop 300 (FIG. 11) and a pitch control loop 300 (FIG. 12) in order to provide additional examples of how the FCC may operate. The control loops illustrated in FIGS. 11 and 12 are intended to be exemplary and are not intended to depict required inputs and outputs. As will be understood, additional or fewer pilot inputs and sensor inputs may be used. Likewise, the pilot inputs and sensor inputs may be used in different arrangements and combinations within the control loop 300.

FIG. 11 provides an exemplary embodiment of a roll control loop 300 during a landed flight state. The FCC 124 may control the roll of the aircraft 10 during a landed flight state according to a first control sub-loop 310*a* based on feedback from an airframe sensor 122*b*, which detects parameters related attitude of the aircraft 10, and may operate a second control sub-loop 315*a* based on feedback from landing gear sensors 122*a*, which detect parameters related to moment of the aircraft 10. For example, with respect to the first control sub-loop 310*a*, the FCC 124 may receive a pilot input related to roll rate and/or roll angle. The FCC 124 may also receive a signal from the airframe sensor 122*b* related to the roll attitude (e.g., roll rate or roll angle) of the aircraft 10. The FCC 124 may determine a first correction factor (i.e., error) between the pilot input and the sensor input. When in the landed flight state, the FCC 124 operates the first control sub-loop 310*a* in a PD control mode, and therefore, determines the first correction factor based on a PD control.

With respect to the second sub-control loop 315*a*, the FCC 124 may receive a pilot input 126 related to a gear roll moment. The FCC 124 may also receive a signal from the landing gear sensors 122*a* related to vertical forces on the landing gear assemblies 35. The FCC 124 may calculate the roll moment of the aircraft based on the vertical forces on the landing gear assemblies 35. The FCC 124 may determine a second correction factor (i.e., error) from the second control sub-loop 315*a*. When in a landed flight state, the FCC 124 operates the second control sub-loop 315*a* in a PID control mode, and therefore, determines the second correction factor based on a PID control. Thereafter, the FCC 124 utilizes the first correction factor and the second correction factor to determined the overall output to the rotor interface 128 to drive the swashplate 131. When wind disturbance or other external factors effect the aircraft 10, the airframe sensors 122*b* and the landing gear sensors 122*a* will detect a shift and send the information back to the FCC 124.

FIG. 12 provides an exemplary embodiment of a pitch control loop 300 during a landed flight state. Like the roll control loop 300 of FIG. 11, the FCC 124 may control the pitch of the aircraft 10 during a landed flight state according to a first control sub-loop 310*a* based on feedback from an airframe sensor 122*b*, which detects parameters related to attitude of the aircraft 10, and may operate a second control sub-loop 315*a* based on feedback from landing gear sensors 122*a*, which detect parameters related to moment of the aircraft 10. For example, with respect to the first control sub-loop 310*a*, the FCC 124 may receive a pilot input related to pitch rate and/or a theta command. The FCC 124 may also receive a signal from the airframe sensor 122*b* related to the pitch attitude (e.g., pitch rate or pitch angle) of the aircraft 10. The FCC 124 may determine a first correction factor (i.e., error) between the pilot input and the sensor input. When in the landed flight state, the FCC 124 operates the first control sub-loop 310*a* in a PD control mode, and therefore, determines the first correction factor based on a PD control.

With respect to the second sub-control loop 315*a*, the FCC 124 may receive a pilot input 126 related to a gear pitch moment. The FCC 124 may also receive a signal from the landing gear sensors 122*a* related to vertical forces on the landing gear assemblies 35. The FCC 124 may calculate the pitch moment of the aircraft based on the vertical forces on the landing gear assemblies 35. The FCC 124 may determine a second correction factor (i.e., error) from the second control sub-loop 315*a*. When in a landed flight state, the FCC 124 operates the second control sub-loop 315*a* in a PID control mode, and therefore determines the second correction factor based on a PID control. Thereafter, the FCC 124 utilizes the first correction factor and the second correction factor to determined the overall output to the rotor interface 128 to drive the swashplate 131. When wind disturbance or other external factors effect the aircraft 10, the airframe sensors 122*b* and the landing gear sensors 122*a* will detect a shift and send the information back to the FCC 124.

FIGS. 13-16 provide flow charts for operation of the FCC 124 in various flight states. The FCC 124 is configured to operate according to the method 400 shown in the flow chart of FIG. 13. In step 410, the FCC 124 receives signals from one or more sensor 122 related to a flight state of the aircraft 10. The FCC 124 determines the flight state of the aircraft based, at least in part, on the signals from the sensors 122 (step 415). When the FCC 124 determines that the aircraft 10 is in a landed flight state, the FCC 124 will switch its operation modes to operate in the landed control mode (step 420). Once in landed control mode, the FCC 124 controls the aircraft 10 according to a control loop 300*a* having a first control sub-loop 310*a* that is active and operating in a PD control mode and a second control sub-loop 315*a* that is active and operating in a PID control mode (step 425). When the FCC 124 determines that the aircraft 10 is in a transition flight state, the FCC 124 will switch its operation mode to operate in transition control mode (step 430). Once in transition control mode, the FCC 124 controls the aircraft 10 according to a control loop 300*b* having a first control sub-loop 310*b* that is active and operating in a PD control mode and a second control sub-loop 315*b* that is inactive (or zeroed out) (step 435). When the FCC 124 determines that the aircraft 10 is in an in-air flight state, the FCC 124 will switch its operation modes to operate in the in-air control mode (step 440). Once in the in-air control mode, the FCC 124 controls the aircraft 10 according to a control loop 300*c* having a first control sub-loop 310*c* that is active and operating in a PID control mode and a second control sub-loop 315*c* that is inactive (or zeroed out) (step 445).

Figure 14:
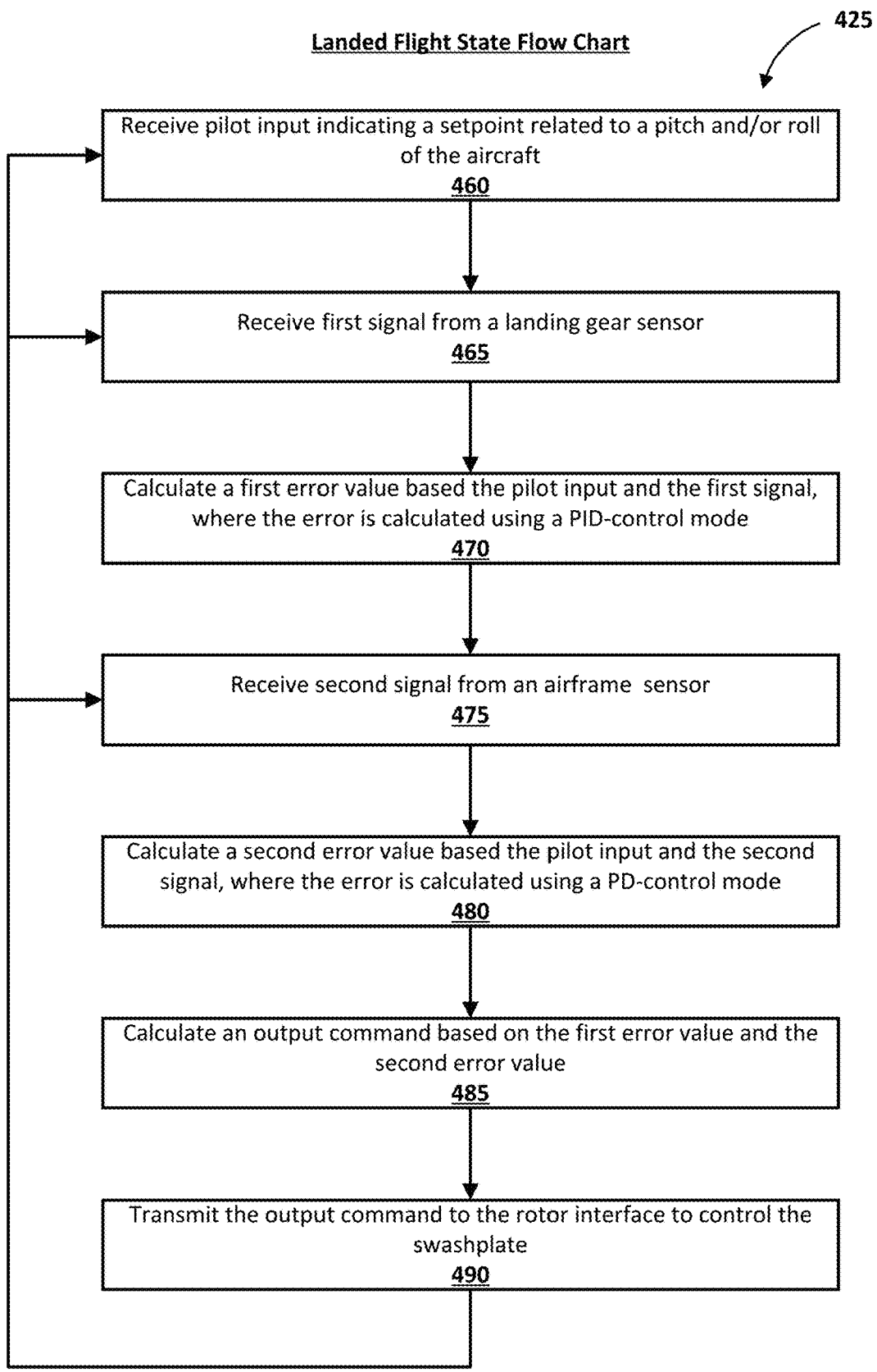
FIG. 14 depicts an exemplary flow chart of a flight control system when the rotary wing aircraft is in a landed flight state.
Figure 15:
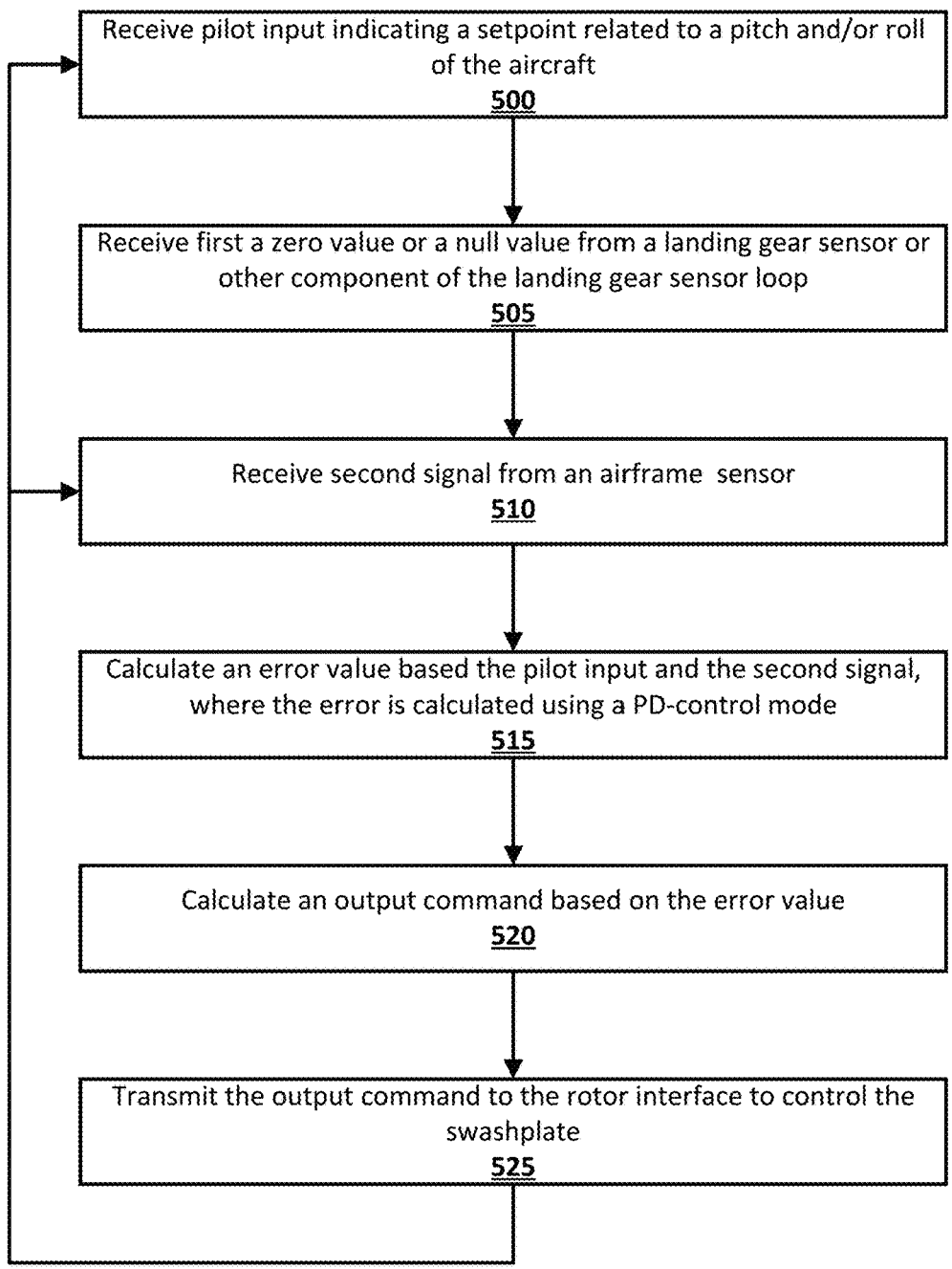
FIG. 15 depicts an exemplary flow chart of a flight control system when the rotary wing aircraft is in a transition flight state.
Figure 16:
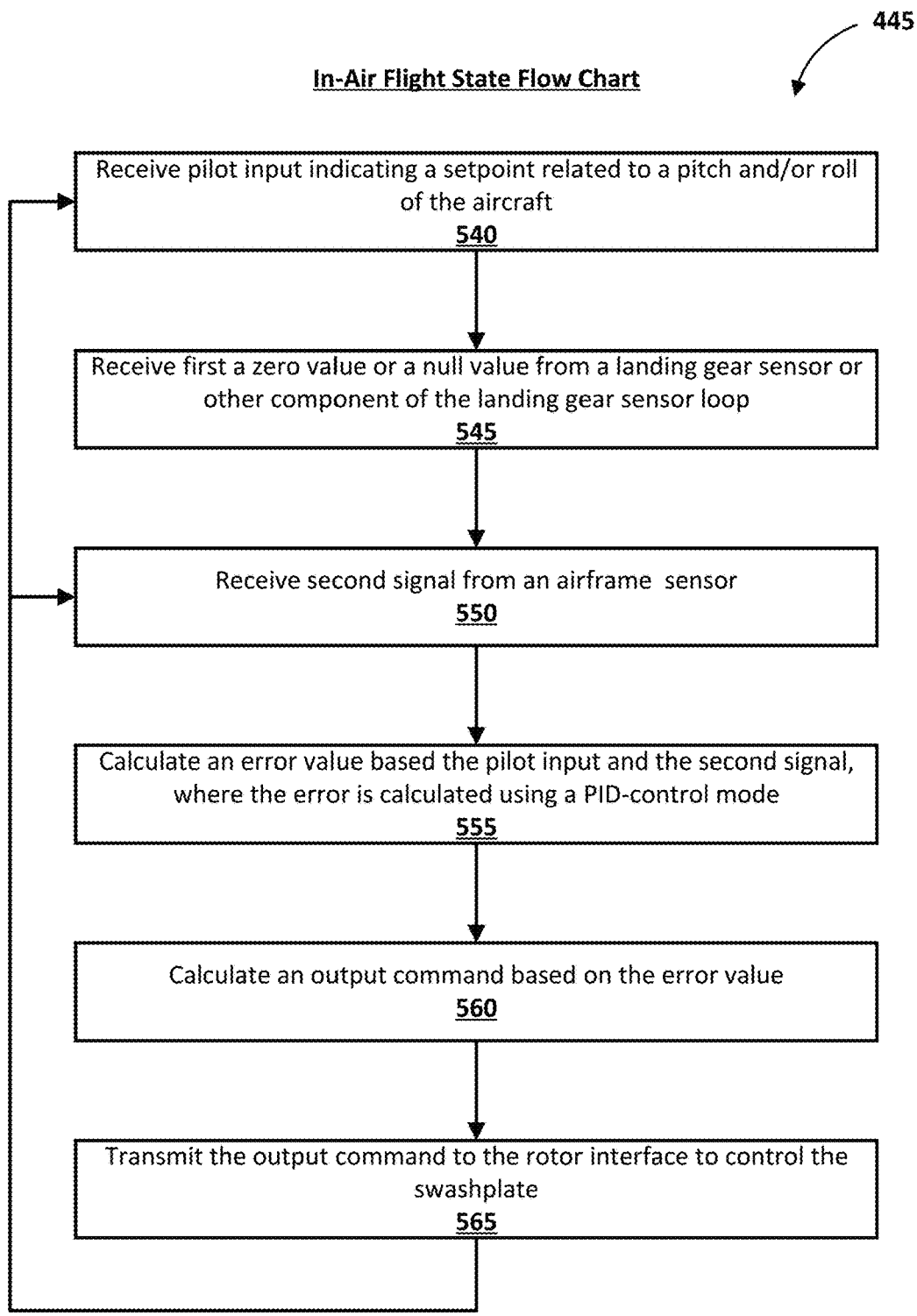
FIG. 16 depicts an exemplary flow chart of a flight control system when the rotary wing aircraft is in an in-air flight state.

FIGS. 14-16 provide exemplary embodiments of the control modes for the landed flight state, the transition flight state, and the in-air flight state. FIG. 14 provides a flow chart for the FCC 124 when the aircraft 10 is in a landed flight state (step 425). The FCC 124 may receive a pilot input indicating a setpoint related to pitch and/or roll of the aircraft 10 (step 460). The FCC 124 may also receive a first signal from a landing gear sensor (step 465) and calculate a first error value based on the pilot input and the first signal (step 470). The first error value is calculated using a PID control mode. The FCC 124 is further configured to receive a second signal from an airframe sensor (step 475) and calculate a second error value based on the pilot input and the second signal (step 480). The first error value is calculated using a PD control mode. The FCC 124 may then calculate an output command based on the first error value and the second error value (step 485), and transmit the output command to the rotor interface to control the swashplate 131 (step 490).

FIG. 15 provides a flow chart for the FCC 124 when the aircraft 10 is in a transition flight state (step 435). The FCC 124 may receive a pilot input indicating a setpoint related to pitch and/or roll of the aircraft 10 (step 500). The FCC 124 may also receive a first signal from a landing gear sensor (step 505) or other component of the landing gear sensor loop representing either a zero value or a null value. The FCC 124 is further configured to receive a second signal from an airframe sensor (step 510) and calculate an error value based on the pilot input and the second signal (step 515). The error value is calculated using a PD control mode. The FCC 124 may then calculate an output command based on the error (step 520), and transmit the output command to the rotor interface to control the swashplate 131 (step 525).

FIG. 16 provides a flow chart for the FCC 124 when the aircraft 10 is in a transition flight state (step 445). The FCC 124 may receive a pilot input indicating a setpoint related to pitch and/or roll of the aircraft 10 (step 540). The FCC 124 may also receive a first signal from a landing gear sensor (step 545) or other component of the landing gear sensor loop representing either a zero value or a null value. The FCC 124 is further configured to receive a second signal from an airframe sensor (step 550) and calculate an error value based on the pilot input and the second signal (step 555). The error value is calculated using a PID control mode. The FCC 124 may then calculate an output command based on the error (step 560), and transmit the output command to the rotor interface to control the swashplate 131 (step 565).

Various features and advantages of the embodiments described herein are set forth in the following claims.

What is claimed is:

1. A control system for an aircraft, the control system comprising:
   a pilot input device configured to receive a pilot input;
   a first sensor positioned on a landing gear of the aircraft, the first sensor configured to sense a force on the landing gear; and
   a controller in communication with the pilot input device and the first sensor, the controller configured to
   receive the pilot input via the pilot input device,
   receive a sensed force on the landing gear via the first sensor,
   calculate an output command based at least on the pilot input and the force on the landing gear, wherein the controller calculates the output command by calculating a correction factor, wherein the pilot input and the sensed force on the landing gear are inputs used to calculate the correction factor, and
   transmit the output command to control the aircraft,
   wherein the controller determines the correction factor using a PID control mode when the aircraft is in a landed flight state.

2. The control system of claim 1, wherein the controller calculates the output command by determining the moment of the landing gear based on the sensed force on the landing gear.

3. The control system of claim 1, wherein the output command controls a rotor of the aircraft.

4. The control system of claim 1, further comprising a second sensor positioned on the landing gear, the second sensor being a weight on wheels sensor.

5. The control system of claim 4, wherein the controller is further configured to determine when the aircraft is in the landed flight state based on a signal received from the second sensor.

6. The control system of claim 1, wherein the first sensor is active when the aircraft is in the landed flight state, and wherein the first sensor is inactive or zeroed-out when the aircraft is in an in-air flight state.

7. The control system of claim 1, further comprising a second sensor positioned on a body of the aircraft, wherein the second sensor is configured to sense a parameter associated with an attitude of the aircraft.

8. The control system of claim 7, wherein the controller is configured to calculate the output command based on the pilot input, the force on the landing gear, and the parameter sensed by the second sensor.

9. The control system of claim 8, wherein the correction factor includes a first component and a second component, wherein the first component is calculated based on the force on the landing gear sensed by the first sensor, and wherein the second component is calculated based on the parameter sensed by the second sensor.

10. The control system of claim 1, wherein the correction factor includes a first component and a second component, wherein the first component is calculated using the PID control mode, and wherein the second component is calculated using a PD control mode.

11. A method of controlling an aircraft, the method comprising:
- receiving, by an electronic processor, a pilot input including a setpoint;
- receiving, by the electronic processor, a first signal from a first sensor positioned on a landing gear of the aircraft;
- calculating, by the electronic processor, a first correction factor wherein the setpoint and the first signal are inputs used to calculate the first correction factor;
- determining, by the electronic processor, an output command based on the first correction factor, the output command including instructions for controlling the aircraft; and
- transmitting, by the electronic processor, the output command to control the aircraft,
- wherein, when the aircraft is in a landed flight state, determining the output command includes determining the output command using a PID control mode.

12. The method of claim 11, wherein receiving the first signal from the first sensor includes receiving at least one of a force on the landing gear and a pressure on the landing gear.

13. The method of claim 11, wherein the output command controls a rotor interface.

14. The method of claim 11, wherein determining the output command includes determining the moment of the landing gear.

15. The method of claim 11, further comprising receiving, by the electronic processor, a second signal from a second sensor positioned on a body of the aircraft, the second sensor configured to sense a parameter associated with an attitude of the aircraft, wherein the output command is further based on the signal from the second sensor.

16. A control system for an aircraft, the control system comprising:
- a pilot input device configured to receive a pilot input;
- a plurality of sensors, each of the plurality of sensors positioned on a corresponding landing gear of the aircraft and configured to sense a parameter on the corresponding landing gear; and
- a controller in communication with the plurality of sensors, the controller configured to calculate an output command based on the pilot input and the sensed parameters of the landing gear, the output command including instructions for controlling a rotor of the aircraft,
- wherein the controller calculates the output command by calculating a correction factor wherein the pilot input and the sensed parameters on the landing gear are inputs used to calculate the correction factor, and
- wherein, when the aircraft is in a landed flight state, the controller is configured to determine the correction factor using a PID control mode.

17. The control system of claim 16, wherein the controller calculates the output command by determining the moment of the landing gear based on the sensed parameters on the landing gear.

* * * * *